United States Patent
Zhou et al.

(10) Patent No.: US 11,610,019 B2
(45) Date of Patent: Mar. 21, 2023

(54) INFORMATION MANAGEMENT METHOD, APPARATUS, AND INFORMATION MANAGEMENT SYSTEM

(71) Applicant: HUAWEI TECHNOLOGIES CO., LTD., Shenzhen (CN)

(72) Inventors: Haojun Zhou, Nanjing (CN); Yaoguo Jiang, Nanjing (CN); Ruifeng Hu, Nanjing (CN); Feihu Jiang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 285 days.

(21) Appl. No.: 16/869,418

(22) Filed: May 7, 2020

(65) Prior Publication Data

US 2020/0320222 A1 Oct. 8, 2020

Related U.S. Application Data

(63) Continuation of application No. PCT/CN2018/098252, filed on Aug. 2, 2018.

(30) Foreign Application Priority Data

Nov. 10, 2017 (CN) .......................... 201711106834.0

(51) Int. Cl.
*G06F 21/62* (2013.01)
*G06F 16/27* (2019.01)
(Continued)

(52) U.S. Cl.
CPC .......... *G06F 21/6245* (2013.01); *G06F 16/27* (2019.01); *H04L 9/0643* (2013.01);
(Continued)

(58) Field of Classification Search
CPC ................. G06F 21/6245; G06F 16/27; G06F 17/30575; G06F 21/6227; G06F 21/64;
(Continued)

(56) References Cited

U.S. PATENT DOCUMENTS 9,635,000 B1 4/2017 Muftic
10,810,290 B2 * 10/2020 Minter .................... G06F 21/64
(Continued)

FOREIGN PATENT DOCUMENTS

CA 2867765 A1 4/2016
CN 105701372 A 6/2016
(Continued)

OTHER PUBLICATIONS

XP047482992 Daniel Augot et al.,"A User-Centric System for Verified Identities on the Bitcoin Blockchain",dated Sep. 13, 2017,total 18 pages.

(Continued)

*Primary Examiner* — Mohammed Waliullah
(74) *Attorney, Agent, or Firm* — Paul Christopher Hashim

(57) ABSTRACT

An information management method includes: receiving an information import request sent by a first agent node, where the information import request includes a first identifier of a user; obtaining a second identifier of the user based on the information import request, and obtaining to-be-imported personal information corresponding to the second identifier of the user; and sending metadata of the user to a block chain node, to store the metadata of the user into the block chain system. In this way, personal information of the user is registered in the block chain system, so that security of the personal information can be effectively ensured, and the user can perform management of and provide external authorized access to the personal information of the user in a unified manner.

14 Claims, 10 Drawing Sheets

(51) Int. Cl.
*H04L 9/06* (2006.01)
*H04L 9/32* (2006.01)
*H04L 67/1074* (2022.01)
*H04L 9/00* (2022.01)

(52) U.S. Cl.
CPC .......... *H04L 9/3247* (2013.01); *H04L 67/108* (2013.01); *H04L 9/50* (2022.05)

(58) Field of Classification Search
CPC ... H04L 9/0643; H04L 9/3247; H04L 67/108; H04L 9/50; H04L 67/56; G06Q 40/02; G06Q 50/265
See application file for complete search history.

(56) References Cited

U.S. PATENT DOCUMENTS

| | | | |
|---|---|---|---|
| 2015/0228004 A1 | 8/2015 | Bednarek et al. | |
| 2015/0310424 A1* | 10/2015 | Myers | G06Q 20/401 705/69 |
| 2016/0098723 A1 | 4/2016 | Feeney | |
| 2017/0264684 A1 | 9/2017 | Spillane et al. | |
| 2020/0311299 A1* | 10/2020 | Amar | G06F 21/6245 |
| 2021/0167962 A1* | 6/2021 | Wang | H04L 9/006 |

FOREIGN PATENT DOCUMENTS

| | | | |
|---|---|---|---|
| CN | 106157040 A | 11/2016 | |
| CN | 106484836 A | 3/2017 | |
| CN | 106780007 A | 5/2017 | |
| CN | 106940850 A | 7/2017 | |
| CN | 106991334 A | 7/2017 | |
| CN | 107079036 A | 8/2017 | |
| CN | 107257340 A | 10/2017 | |
| CN | 107274130 A | 10/2017 | |
| CN | 109074566 A | 12/2018 | |
| CN | 109426949 A | 3/2019 | |
| WO | WO-2017079795 A1 * | 5/2017 | ......... G06Q 20/3823 |

OTHER PUBLICATIONS

XP055572435 Guy Zyskind et al.,"Decentralizing Privacy: Using Blockchain to Protect Personal Data",2015 IEEE Security and Privacy Workshops,total 5 pages.

* cited by examiner

INFORMATION MANAGEMENT METHOD, APPARATUS, AND INFORMATION MANAGEMENT SYSTEM

CROSS-REFERENCE TO RELATED APPLICATIONS

This application is a continuation of International Patent Application No. PCT/CN2018/098252, filed on Aug. 2, 2018, which claims priority to Chinese Patent Application No. 201711106834.0, filed on Nov. 10, 2017. The disclosures of the aforementioned applications are hereby incorporated by reference in their entireties.

TECHNICAL FIELD

Aspects of the present invention relate to the field of communications technologies, and in particular, to an information management method, an apparatus, and an information management system.

BACKGROUND

A personal information management server (PIMS) is a digital system configured to store and manage personal information (such as a name, an identity card number, a phone number, and a consumption record) of a user. In the prior art, different service providers (SPs) internally have respective PIMSs to manage personal information of users. For example, a PIMS of a bank A manages personal information of a user belonging to the bank A, and a PIMS of a bank B manages personal information of a user belonging to the bank B. The personal information of the users that is recorded in the PIMSs of the different SPs may be the same (for example, a user registers real-name information of the user with a bank and TaoBao, including a name, an identity card number, and a phone number), or may be different (for example, a PIMS of a bank records deposit and loan information of a user, and a PIMS of TaoBao stores shopping information of the user).

Because the personal information of the users is dispersedly managed by the PIMSs of the different service providers, a series of problems may exist. For example, a user cannot perform management of and provide external authorized access to personal information of the user in a unified manner; and when the personal information is shared between a plurality of agencies, the user needs to separately authorize the plurality of agencies, consequently causing the sharing to be relatively inconvenient, and the like. For another example, personal information of a user is stored in a PIMS, and consequently is easy to be tampered with, causing a security threat to both the user and an SP.

SUMMARY

An embodiment of this application provides an information management method, to import personal information of a user into a block chain system, so that the user can perform management of and provide external authorized access to the personal information of the user in a unified manner.

According to a first aspect, an embodiment of this application provides an information management method. The method is applied to a personal information management server PIMS. The method includes:

receiving an information import request sent by a first agent node, where the information import request includes a first identifier of a user, and the first identifier of the user is an identity identifier of the user in a block chain system;

obtaining a second identifier of the user based on the information import request, and obtaining to-be-imported personal information corresponding to the second identifier of the user, where the second identifier of the user is an identity identifier of the user in the PIMS; and sending metadata of the user to at least one block chain node in the block chain system, so that the at least one block chain node stores the metadata of the user into the block chain system, where the metadata of the user includes the to-be-imported personal information and the first identifier of the user.

In this way, because personal information of the user is stored in the block chain system, security of the personal information can be effectively ensured, PIMSs of different SPs can jointly provide an external unified personal information service, and further, the user can also perform management of and provide external authorized access to the personal information of the user in a unified manner, effectively resolving a problem in the prior art that the user needs to separately authorize a plurality of agencies, consequently causing information sharing to be relatively inconvenient.

In a possible design, the information import request further includes authorization information of the user for the PIMS, and the authorization information includes any one of or any combination of authorization for importing personal information of the user into the block chain system, authorization for updating the personal information of the user to the block chain system, or authorization for removing the personal information of the user from the block chain system.

In this way, the information import request includes the authorization information of the user for the PIMS, so that an effective operation of the PIMS can be effectively ensured, avoiding unauthorized processing, and on the other hand, the user may perform selective authorization based on a requirement of the user, improving user experience.

In a possible design, the information import request further includes a to-be-imported personal information field identifier; and the obtaining to-be-imported personal information corresponding to the second identifier of the user includes:

obtaining personal information corresponding to the second identifier of the user, and obtaining, based on the to-be-imported personal information field identifier, the to-be-imported personal information from the personal information corresponding to the second identifier of the user.

In this manner, the user may freely select personal information needing to be imported, so that a user requirement is easily satisfied, and there are relatively high flexibility and adaptability.

In a possible design, the obtaining a second identifier of the user based on the information import request includes:

obtaining, based on the first identifier of the user and a pre-stored correspondence between the first identifier of the user and the second identifier of the user, the second identifier of the user corresponding to the first identifier of the user; or obtaining the second identifier of the user from the information import request, where the information import request further includes the second identifier of the user; or displaying a login page based on the information import request, and obtaining the second identifier of the user based on information entered on the login page by the user.

In a possible design, the sending metadata of the user to at least one block chain node in the block chain system includes:

sending, based on an identifier of a block chain node corresponding to the PIMS, the metadata of the user to the block chain node corresponding to the PIMS.

In this way, a correspondence between the PIMS and the block chain node is bound in advance, so that the PIMS may send the metadata of the user to a corresponding block chain node in a targeted manner.

In a possible design, the method further includes:

after detecting that the personal information of the user is changed, if determining that a personal information field identifier corresponding to the changed personal information is registered in the block chain system, sending an update request to the block chain node, or if determining that a personal information field identifier corresponding to the changed personal information is not registered in the block chain system, providing first prompt information about whether to import the changed personal information into the block chain system, and sending an update request to the block chain node after receiving an import allowing instruction of the user, where the update request includes the changed personal information and the first identifier of the user.

In this way, after detecting that the personal information of the user is changed, the PIMS may actively trigger an update procedure, so that the changed personal information is updated to the block chain system, effectively ensuring consistency between personal information stored in the block chain system and actual information; and because the PIMS may trigger the update procedure after detecting that the personal information is changed, the personal information is updated in a relatively timely manner, improving user experience.

In a possible design, the update request further includes an update type, and the update type is adding data and/or changing data.

According to a second aspect, an embodiment of this application provides an information management method. The method is applied to a first agent node. The method includes:

receiving an import instruction of a user, where the import instruction includes an identifier corresponding to a PIMS; and sending an information import request to the PIMS based on the identifier corresponding to the PIMS, where the information import request includes a first identifier of the user and authorization information of the user for the PIMS, the first identifier of the user is an identity identifier of the user in a block chain system, and the authorization information includes any one of or any combination of authorization for importing personal information of the user into the block chain system, authorization for updating the personal information of the user to the block chain system, or authorization for removing the personal information of the user from the block chain system.

In this way, after receiving the import instruction of the user, the first agent node triggers the PIMS to send the personal information of the user to a block chain node, so that the personal information of the user is stored in the block chain system, security of the personal information is effectively ensured, PIMSs of different SPs can jointly provide an external unified personal information service, and further, the user can also perform management of and provide external authorized access to the personal information of the user in a unified manner, effectively resolving a problem in the prior art that the user needs to separately authorize a plurality of agencies, consequently causing information sharing to be relatively inconvenient.

In a possible design, the import request further includes a to-be-imported personal information field identifier; and the to-be-imported personal information field identifier is obtained in the following manner:

obtaining, based on the identifier corresponding to the PIMS, a personal information field identifier provided by the PIMS, and presenting the personal information field identifier to the user; and obtaining the to-be-imported personal information field identifier based on a personal information field identifier selected by the user from the personal information field identifier provided by the PIMS.

In a possible design, the method further includes:

sending an access authorization notification to a block chain node after receiving an access authorization instruction of the user, where the access authorization notification includes an access permission for the personal information of the user;

receiving an access authorization result returned by the block chain node, where the access authorization result includes an identifier of a token generated by the block chain node based on the access authorization notification; and sending the identifier of the token to a second agent node, so that the second agent node obtains to-be-accessed personal information from the block chain system based on the identifier of the token.

In other words, the first agent node sends the access authorization notification to the block chain node, and the block chain node generates the token based on the access authorization notification, and sends the identifier of the token to the first agent node. In this way, the second agent node may obtain the identifier of the token from the first agent node, and obtain, from the block chain node based on the identifier of the token, personal information corresponding to a to-be-accessed personal information field identifier, thereby implementing sharing of the personal information. Because the user only needs to perform unified authorization in an information sharing process, convenience of the sharing of the personal information can be effectively improved.

In a possible design, the access authorization notification further includes a personal information field identifier that is authorized by the user to be accessed; and the personal information field identifier that is authorized by the user to be accessed is obtained in the following manner:

receiving an authorization request sent by the second agent node, and providing, based on the authorization request, second prompt information about whether to allow authorized access; and receiving the access authorization instruction of the user, and obtaining, based on the access authorization instruction, the personal information field identifier that is authorized by the user to be accessed.

In a possible design, before the receiving an authorization request sent by the second agent node, the method further includes:

receiving a metadata request sent by the second agent node, where the metadata request is used to request metadata of the user; and sending the metadata of the user to the second agent node based on the metadata request; or sending the first identifier of the user to the second agent node based on the metadata request, so that the second agent node obtains the metadata of the user from the block chain system based on the first identifier, where the metadata of the user includes a personal information field identifier of the user, and the metadata of the user is used by the second agent node to select, from the personal information field identifier of the user, a personal information field identifier needing to be accessed.

In a possible design, the sending an access authorization notification to a block chain node includes:

obtaining metadata of the user, where the metadata of the user includes a personal information field identifier of the user and a block chain node corresponding to the personal information field identifier of the user;

obtaining, based on the personal information field identifier that is authorized by the user to be accessed and the metadata of the user, a block chain node corresponding to the personal information field identifier that is authorized by the user to be accessed; and sending the access authorization notification to the block chain node corresponding to the personal information field identifier that is authorized by the user to be accessed.

In a possible design, the access permission for the personal information of the user includes any one of or any combination of the following:

an identifier of an authorized agent node, a quantity of times of authorized access, or an authorized access time.

According to a third aspect, an embodiment of this application provides an information management method. The method is applied to a first block chain node in a block chain system. The method includes:

receiving an access authorization notification sent by a first agent node, where the access authorization notification includes an access permission for personal information of a user;

generating a token based on the access authorization notification; and sending an access authorization result to the first agent node, where the access authorization result includes an identifier of the token.

In the foregoing method, the block chain node generates the token based on the access authorization notification of the first agent node, and sends the identifier of the token to the first agent node. In this way, the second agent node may obtain the identifier of the token from the first agent node, and obtain, from the block chain node based on the identifier of the token, personal information corresponding to a to-be-accessed personal information field identifier, thereby implementing sharing of the personal information. Because the user only needs to perform unified authorization in an information sharing process, convenience of the sharing of the personal information can be effectively improved.

In a possible design, the access authorization notification further includes a personal information field identifier that is authorized by the user to be accessed; and generating the token based on the access authorization notification includes:

after determining that the personal information field identifier that is authorized by the user to be accessed is registered in the block chain system, generating the token based on the personal information field identifier that is authorized by the user to be accessed.

In this way, whether the personal information field identifier that is authorized by the user to be accessed is registered in the block chain system is checked, to effectively improve reliability of generating the token.

In a possible design, after the sending an access authorization result to the first agent node, the method further includes:

receiving a first access request sent by a second agent node, where the first access request includes the identifier of the token and a to-be-accessed personal information field identifier; and after reading, from the block chain system based on the identifier of the token, the token corresponding to the identifier of the token, and determining that the first access request complies with an access permission included in the token, obtaining personal information corresponding to the to-be-accessed personal information field identifier, and sending the personal information to the second agent node.

In a possible design, after the sending the personal information corresponding to the to-be-accessed personal information field identifier to the second agent node, the method further includes:

generating use information of the token, and recording the use information of the token into the block chain system.

In a possible design, the access permission for the personal information of the user includes any one of or any combination of the following:

an identifier of an authorized agent node, a quantity of times of authorized access, or an authorized access time.

In a possible design, the method further includes:

receiving an update request sent by a PIMS, where the update request includes a first identifier of the user and changed personal information; and obtaining metadata of the user based on the first identifier of the user, and updating the metadata of the user based on the changed personal information.

In a possible design, after the receiving an update request sent by a PIMS, the method further includes:

sending an update notification message to a second block chain node in the block chain system after determining that the changed personal information is public information of the user, and instructing, by the second block chain node, another PIMS storing the public information to update the public information.

According to a fourth aspect, an embodiment of this application provides a PIMS. The PIMS includes:

a receiving module, configured to receive an information import request sent by a first agent node, where the information import request includes a first identifier of a user, and the first identifier of the user is an identity identifier of the user in a block chain system;

a processing module, configured to: obtain a second identifier of the user based on the information import request, and obtain to-be-imported personal information corresponding to the second identifier of the user, where the second identifier of the user is an identity identifier of the user in the PIMS; and a sending module, further configured to send metadata of the user to at least one block chain node in the block chain system, so that the at least one block chain node stores the metadata of the user into the block chain system, where the metadata of the user includes the to-be-imported personal information and the first identifier of the user.

In a possible design, the information import request further includes authorization information of the user for the PIMS, and the authorization information includes any one of or any combination of authorization for importing personal information of the user into the block chain system, authorization for updating the personal information of the user to the block chain system, or authorization for removing the personal information of the user from the block chain system.

In a possible design, the information import request further includes a to-be-imported personal information field identifier; and the processing module is further configured to:

obtain personal information corresponding to the second identifier of the user, and obtain, based on the to-be-imported personal information field identifier, the to-be-imported personal information from the personal information corresponding to the second identifier of the user.

In a possible design, the processing module is specifically configured to:

obtain, based on the first identifier of the user and a pre-stored correspondence between the first identifier of the user and the second identifier of the user, the second identifier of the user corresponding to the first identifier of the user; or obtain the second identifier of the user from the information import request, where the information import request further includes the second identifier of the user; or display a login page based on the information import request, and obtaining the second identifier of the user based on information entered on the login page by the user.

In a possible design, the sending module is specifically configured to:

send, based on an identifier of a block chain node corresponding to the PIMS, the metadata of the user to the block chain node corresponding to the PIMS.

In a possible design, the processing module is further configured to:

after detecting that the personal information of the user is changed, if determining that a personal information field identifier corresponding to the changed personal information is registered in the block chain system, send an update request to the block chain node by using the sending module, where the update request includes the changed personal information and the first identifier of the user.

In a possible design, the update request further includes an update type, and the update type is adding data and/or changing data.

According to a fifth aspect, an embodiment of this application provides an agent node. The agent node includes:

a receiving module, configured to receive an import instruction of a user, where the import instruction includes an identifier corresponding to a PIMS; and a sending module, configured to send an information import request to the PIMS based on the identifier corresponding to the PIMS, where the information import request includes a first identifier of the user and authorization information of the user for the PIMS, the first identifier of the user is an identity identifier of the user in a block chain system, and the authorization information includes any one of or any combination of authorization for importing personal information of the user into the block chain system, authorization for updating the personal information of the user to the block chain system, or authorization for removing the personal information of the user from the block chain system.

In a possible design, the import request further includes a to-be-imported personal information field identifier; and the agent node further includes a processing module, and the processing module obtains the to-be-imported personal information field identifier in the following manner:

obtaining, based on the identifier corresponding to the PIMS, a personal information field identifier provided by the PIMS, and presenting the personal information field identifier to the user; and obtaining the to-be-imported personal information field identifier based on a personal information field identifier selected by the user from the personal information field identifier provided by the PIMS.

In a possible design, after the receiving module receives an access authorization instruction of the user, the sending module is further configured to send an access authorization notification to a block chain node, where the access authorization notification includes an access permission for the personal information of the user;

the receiving module is further configured to receive an access authorization result returned by the block chain node, where the access authorization result includes an identifier of a token generated by the block chain node based on the access authorization notification; and the processing module is further configured to send the identifier of the token to a second agent node, so that the second agent node obtains to-be-accessed personal information from the block chain system based on the identifier of the token.

In a possible design, the access authorization notification further includes a personal information field identifier that is authorized by the user to be accessed; and the processing module is further configured to: receive, by using the receiving module, an authorization request sent by the second agent node, and provide, based on the authorization request, second prompt information about whether to allow authorized access; and receive the access authorization instruction of the user, and obtain, based on the access authorization instruction, the personal information field identifier that is authorized by the user to be accessed.

In a possible design, before receiving the authorization request sent by the second agent node, the receiving module is further configured to receive a metadata request sent by the second agent node, where the metadata request is used to request metadata of the user; and the sending module is further configured to send the metadata of the user to the second agent node based on the metadata request; or send the first identifier of the user to the second agent node based on the metadata request, so that the second agent node obtains the metadata of the user from the block chain system based on the first identifier, where the metadata of the user includes a personal information field identifier of the user, and the metadata of the user is used by the second agent node to select, from the personal information field identifier of the user, a personal information field identifier needing to be accessed.

In a possible design, the sending module is specifically configured to:

obtain metadata of the user, where the metadata of the user includes a personal information field identifier of the user and a block chain node corresponding to the personal information field identifier of the user;

obtain, based on the personal information field identifier that is authorized by the user to be accessed and the metadata of the user, a block chain node corresponding to the personal information field identifier that is authorized by the user to be accessed; and send the access authorization notification to the block chain node corresponding to the personal information field identifier that is authorized by the user to be accessed.

In a possible design, the access permission for the personal information of the user includes any one of or any combination of the following:

an identifier of an authorized agent node, a quantity of times of authorized access, or an authorized access time.

According to a sixth aspect, an embodiment of this application provides a block chain node. The block chain node includes:

a receiving module, configured to receive an access authorization notification sent by a first agent node, where the access authorization notification includes an access permission for personal information of a user;

a processing module, configured to generate a token based on the access authorization notification; and a sending module, configured to send an access authorization result to the first agent node, where the access authorization result includes an identifier of the token.

In a possible design, the access authorization notification further includes a personal information field identifier that is authorized by the user to be accessed; and the processing module is specifically configured to:

after determining that the personal information field identifier that is authorized by the user to be accessed is registered in the block chain system, generate the token based on the personal information field identifier that is authorized by the user to be accessed.

In a possible design, the receiving module is further configured to:

receive a first access request sent by a second agent node, where the first access request includes the identifier of the token and a to-be-accessed personal information field identifier; and the processing module is further configured to: after reading, from the block chain system based on the identifier of the token, the token corresponding to the identifier of the token, and determining that the first access request complies with an access permission included in the token, obtain personal information corresponding to the to-be-accessed personal information field identifier, and send the personal information to the second agent node by using the sending module.

In a possible design, after the sending module sends the personal information corresponding to the to-be-accessed personal information field identifier to the second agent node, the processing module is further configured to: generate use information of the token, and record the use information of the token into the block chain system.

In a possible design, the access permission for the personal information of the user includes any one of or any combination of the following:

an identifier of an authorized agent node, a quantity of times of authorized access, or an authorized access time.

In a possible design, the receiving module is further configured to receive an update request sent by a PIMS, where the update request includes a first identifier of the user and changed personal information; and the processing module is further configured to: obtain metadata of the user based on the first identifier of the user, and update the metadata of the user based on the changed personal information.

In a possible design, the processing module is further configured to send an update notification message to a second block chain node in the block chain system by using the sending module after determining that the changed personal information is public information of the user, and the second block chain node instructs another PIMS storing the public information to update the public information.

According to a seventh aspect, an embodiment of this application provides an information management system. The information management system includes one or more agent nodes, a block chain system, and one or more PIMSs, where the block chain system includes a plurality of block chain nodes;

a first agent node is configured to: receive an import instruction of a user, where the import instruction includes an identifier corresponding to a PIMS; and send an information import request to the PIMS, where the information import request includes a first identifier of the user, the first identifier of the user is an identity identifier of the user in the block chain system, and the first agent node is any agent node in the information management system;

the PIMS receives an information import request sent by the first agent node, where the information import request includes the first identifier of the user, and the first identifier of the user is the identity identifier of the user in the block chain system; obtains a second identifier of the user based on the information import request, and obtains to-be-imported personal information corresponding to the second identifier of the user, where the second identifier of the user is an identity identifier of the user in the PIMS; and sends metadata of the user to at least one block chain node in the block chain system, where the metadata of the user includes the to-be-imported personal information and the first identifier of the user; and the block chain node is configured to: receive the metadata of the user sent by the PIMS, and store the metadata of the user into the block chain system.

In a possible design, the information import request further includes a to-be-imported personal information field identifier; and the to-be-imported personal information field identifier is obtained in the following manner:

obtaining, by the first agent node based on the identifier corresponding to the PIMS, a personal information field identifier provided by the PIMS, and presenting the personal information field identifier to the user; and obtaining, by the first agent node, the to-be-imported personal information field identifier based on a personal information field identifier selected by the user from the personal information field identifier provided by the PIMS.

In a possible design, the PIMS is further configured to: after detecting that the personal information of the user is changed, if determining that a personal information field identifier corresponding to the changed personal information is registered in the block chain system, send an update request to the block chain node, where the update request includes the changed personal information and the first identifier of the user; and the block chain node is further configured to: receive the update request, obtain metadata of the user based on the first identifier of the user, and update the metadata of the user based on the changed personal information.

According to an eighth aspect, an embodiment of this application provides an information management system. The information management system includes one or more agent nodes, a block chain system, and one or more PIMSs, where the block chain system includes a plurality of block chain nodes;

a first agent node is configured to: send an access authorization notification to the block chain nodes after receiving an access authorization instruction of the user, where the access authorization notification includes an access permission for the personal information of the user; and receive an access authorization result returned by the block chain nodes, where the first agent node is any agent node in the information management system;

the block chain nodes are configured to: receive the access authorization notification sent by the first agent node, generate a token, and send the access authorization result to the first agent node, where the access authorization result includes an identifier of the token; and a second agent node is configured to: obtain the identifier of the token from the first agent node, and obtain to-be-accessed personal information from the block chain nodes based on the identifier of the token, where the second agent node is any agent node other than the first agent node in the information management system.

According to a ninth aspect, an embodiment of this application provides a server. The server may be the PIMS in the foregoing first aspect or fourth aspect. The server has functions in the example for implementing the method in the foregoing first aspect. The server includes: a communications module and a processor, where the processor is configured to implement functions of the processing module in the fourth aspect, including: obtaining a second identifier of the user based on the information import request, and obtaining to-be-imported personal information corresponding to the second identifier of the user, where the second identifier of the user is an identity identifier of the user in the PIMS; and the communications module is configured to communicate and interact with another device, for example, receive an information import request sent by a first agent node, where the information import request includes a first identifier of a user, and the first identifier of the user is an identity identifier of the user in a block chain system; and send metadata of the user to at least one block chain node in the block chain system, so that the at least one block chain node stores the metadata of the user into the block chain system, where the metadata of the user includes the to-be-imported personal information and the first identifier of the user.

The communications module may be an RF circuit, a Wi-Fi module, a communications interface, a Bluetooth module, or the like.

Optionally, the server may further include: a memory, configured to store a program, or the like. Specifically, the program may include program code, and the program code includes an instruction. The memory may include a random access memory (RAM), or may further include a non-volatile memory, such as at least one magnetic disk memory. The processor executes the application program stored in the memory, to implement the foregoing functions.

In a possible implementation, the communications module, the processor, and the memory may be connected to each other by using the bus. The bus may be a peripheral component interconnect (PCI) bus, an extended industry standard architecture (EISA) bus, or the like. The bus may be classified into an address bus, a data bus, a control bus, or the like.

According to a tenth aspect, an embodiment of this application provides a client device. The client device may be the agent node in the foregoing second aspect or fifth aspect. The client device has functions in the example for implementing the method in the foregoing fifth aspect. The client device includes: a communications module and a processor, where the processor is configured to implement functions of the processing module in the fifth aspect; and the communications module is configured to communicate and interact with another device, for example, receive an import instruction of a user, where the import instruction includes an identifier corresponding to a PIMS; and send an information import request to the PIMS based on the identifier corresponding to the PIMS.

The communications module may be an RF circuit, a Wi-Fi module, a communications interface, a Bluetooth module, or the like.

Optionally, the client device may further include: the memory, configured to store a program, or the like. Specifically, the program may include program code, and the program code includes an instruction. The memory may include a RAM, or may further include a non-volatile memory, for example, at least one magnetic disk memory. The processor executes the application program stored in the memory, to implement the foregoing functions.

In a possible manner, the communications module, the processor, and the memory may be connected to each other by using the bus. The bus may be a PCI bus, an EISA bus, or the like. The bus may be classified into an address bus, a data bus, a control bus, and the like.

According to an eleventh aspect, an embodiment of this application further provides a block chain node. The block chain node has functions in the example for implementing the method in the foregoing sixth aspect. The block chain node includes: a communications module and a processor, where the processor is configured to implement functions of the processing module in the sixth aspect, including: generating a token based on the access authorization notification; and the communications module is configured to communicate and interact with another device, for example, receive an access authorization notification sent by a first agent node, where the access authorization notification includes an access permission for personal information of a user; and send an access authorization result to the first agent node, where the access authorization result includes an identifier of the token.

The communications module may be an RF circuit, a Wi-Fi module, a communications interface, a Bluetooth module, or the like.

Optionally, the block chain node may further include: the memory, configured to store a program, or the like. Specifically, the program may include program code, and the program code includes an instruction. The memory may include a RAM, or may further include a non-volatile memory, for example, at least one magnetic disk memory. The processor executes the application program stored in the memory, to implement the foregoing functions.

In a possible manner, the communications module, the processor, and the memory may be connected to each other by using the bus. The bus may be a PCI bus, an EISA bus, or the like. The bus may be classified into an address bus, a data bus, a control bus, and the like.

An embodiment of this application further provides a computer readable storage medium. The readable storage medium stores an instruction. When the instruction is run on a computer, the computer is enabled to perform the information management method according to any one of the foregoing designs.

An embodiment of this application further provides a computer program product including an instruction. When the computer program product is run on a computer, the computer is enabled to perform the information management method according to any one of the foregoing designs.

An embodiment of this application further provides a computer program. When the computer program is run on a computer, the computer is enabled to perform the information management method according to any one of the foregoing designs.

DESCRIPTION OF EMBODIMENTS

The following describes the embodiments of this application in detail with reference to accompanying drawings of this specification. "Any one of or any combination of x or y", "and/or", "at least one of x or y" or any variation means "x", "y" or both "x" and "y".

Figure 1:
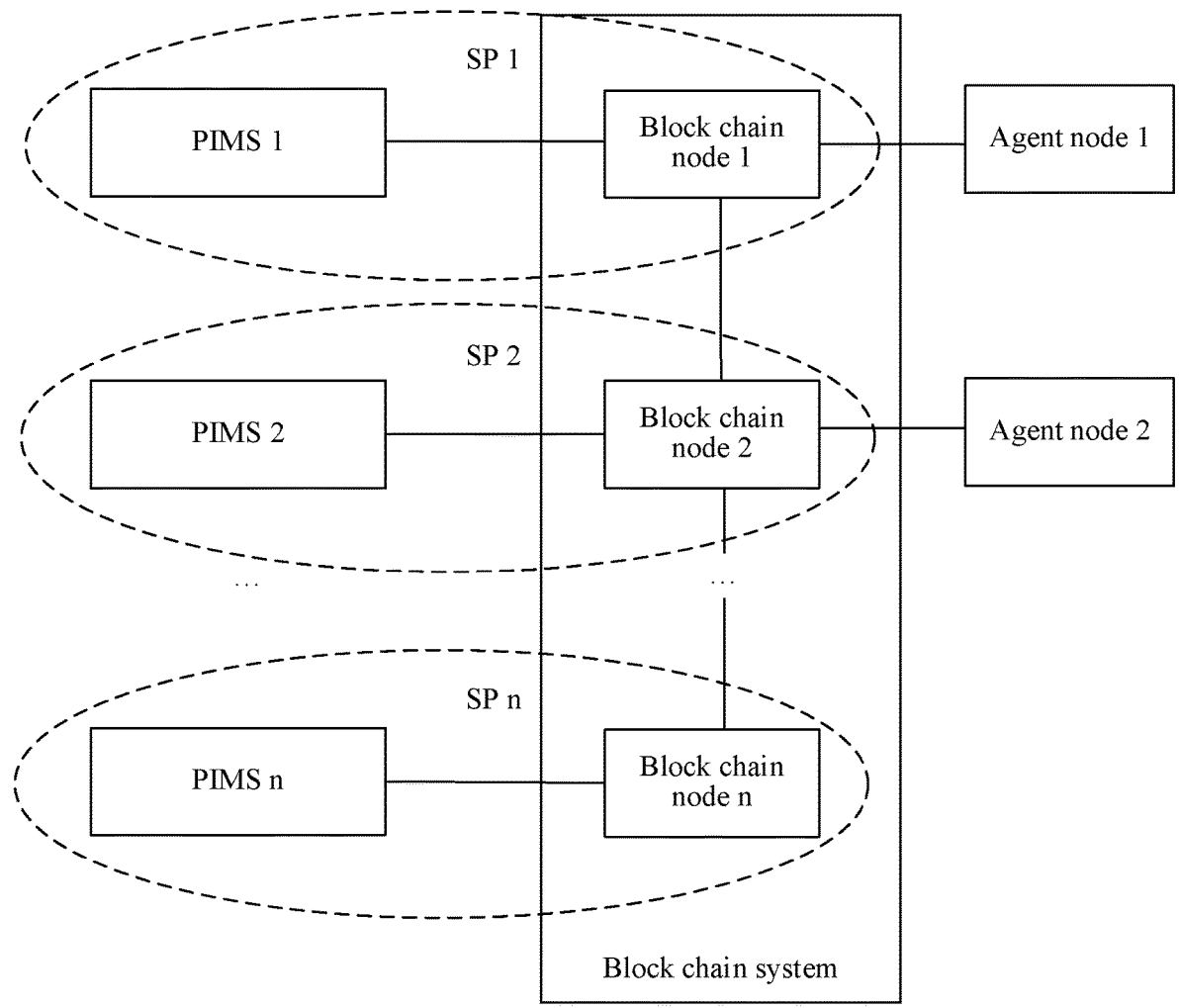
FIG. 1 is a diagram of a system architecture to which an embodiment of this application is applicable.

FIG. 1 is a diagram of a system architecture to which an embodiment of this application is applicable. As shown in FIG. 1, the system architecture includes PIMSs of a plurality of SPs (for example, a PIMS 1 of an SP 1, a PIMS 2 of an SP 2, . . . , and a PIMS n of an SP n that are shown in FIG. 1, where n is an integer greater than 1), a block chain system, and a plurality of agent nodes (agent) (for example, an agent node 1 and an agent node 2 shown in FIG. 1).

A PIMS is configured to store and manage personal information of a user of an SP. For example, a bank A, a bank B, and a bank C respectively have their own PIMSs, to manage personal information, such as deposits, loans, and payments, of respective users.

A block chain, in a narrow sense, is a paradigm for storing a record (data). In a broad sense, the block chain is performing a decentralized trustworthy computing task based on reliable data by using an intelligent agreement. In a block chain system, all data is stored in a block, and newly written data forms a new block, the new block is added to an end of a current block chain. When storing data, each block further needs to store a number (which is often a hash value of data of all records) uniquely corresponding to data of all records in a previous block, thereby forming a chain. Therefore, the block chain system may be considered to be a system in which computers that are on a distributed network and that do not completely trust each other jointly maintain, according to a consensus rule, a set of chain data that can be traced and cannot be tampered with.

The block chain system includes a plurality of block chain nodes, for example, a block chain node 1, a block chain node 2, . . . , and a block chain node m shown in FIG. 1, where m is an integer greater than 1. The block chain nodes are responsible for maintaining respective local ledgers. The local ledgers are used to record personal information registered in the block chain system. Consistency of data of the local ledgers are ensured between the block chain nodes by using a consensus mechanism. The consensus mechanism is the prior art of the block chain system, and details are not described herein again.

An agent node is configured to communicate with the block chain nodes in the block chain system, thereby providing a personal information service to a user. Specifically, the agent node may be a dedicated client application, web page plug-in, or the like. For example, the agent node 1 may be a client application of the bank A, and the agent node 2 may be a client application of the bank B.

In a possible implementation of this embodiment of this application, the PIMSs of SPs and the block chain nodes may be set in a correspondence manner, and further, may be set in a one-to-one correspondence manner. As shown in FIG. 1, the block chain node 1 corresponds to the PIMS 1 of the SP 1, the block chain node 2 corresponds to the PIMS 2 of the SP 2, . . . , and the block chain node n corresponds to the PIMS n of the SP n. For example, three SPs (the bank A, the bank B, and the bank C) jointly establish a block chain system. Each bank separately provides one block chain node, to represent the bank to participate in running of the block chain system. The block chain node of each bank separately connects to a PIMS of the bank. A block chain node of a SP is responsible for processing a request initiated by a PIMS corresponding to the same SP, thereby ensuring that information registered in the block chain system by a bank is checked and endorsed by a block chain node corresponding to the bank.

It should be noted that the foregoing one-to-one correspondence between the PIMSs of the SPs and the block chain nodes is only a possible implementation of the system architecture. In another possible implementation, alternatively, only a few SPs may be responsible for establishing the block chain system, and another SP is only responsible for providing data. For example, several large commercial banks, such as China Merchants Bank, China Construction Bank, and Communications Bank of China, jointly establish a block chain system, responsible for providing block chain nodes, but some small banks, such as Bank of Nanjing, do not provide block chain nodes, and only connect to the block chain system as providers of personal information. In this case, a PIMS may be bound to a block chain node. For example, Bank of Nanjing cooperates with China Merchants Bank, and connects to the block chain node of China Merchants Bank, and the block chain node of China Merchants Bank is responsible for checking and endorsing information provided by the block chain node of Bank of Nanjing. Certainly, binding may be not performed. For example, China Merchants Bank, China Construction Bank, and Communications Bank of China all trust Bank of Nanjing, and a digital certificate of Bank of Nanjing is set as a trustworthy digital certificate on all the block chain nodes of the three banks, so that a PIMS of Bank of Nanjing may interact with any block chain node of the three banks.

Based on the system architecture shown in FIG. 1, an embodiment of this application provides an information management method. The information management method may specifically include an information import method, an information update method, and an information sharing method.

The information import method includes: receiving, by a PIMS, an information import request sent by a first agent node, where the information import request includes a first identifier of a user, and the first identifier of the user is an identity identifier of the user in a block chain system, where for example, the first identifier may be an identifier of a digital certificate issued to the user by a digital certificate server of the block chain system; obtaining a second identifier of the user based on the information import request, and obtaining to-be-imported personal information corresponding to the second identifier of the user, where the second identifier of the user is an identity identifier of the user in the PIMS, where for example, the second identifier may be a user name/a password of the user in a service provider corresponding to the PIMS; and sending metadata of the user to at least one block chain node in the block chain system, so that the at least one block chain node stores the metadata of the user into the block chain system, where the metadata of the user includes the to-be-imported personal information and the first identifier of the user. In this way, personal information of the user is registered in the block chain system, so that security of the personal information can be effectively ensured, and PIMS s of different SPs can jointly provide an external unified personal information service.

The information update method includes: after detecting that the personal information of the user is changed, if determining that a personal information field identifier corresponding to the changed personal information is registered in the block chain system, sending, by the PIMS, an update request to the block chain node, where the update request includes the changed personal information and the first identifier of the user. In this way, the PIMS actively triggers an update of the personal information of the user, so that it can be ensured that personal information of a user in the block chain system is kept consistent with actual information, improving accuracy of the personal information of the user.

The information sharing method includes: receiving an access authorization notification sent by a first agent node, where the access authorization notification includes an access permission for personal information of a user; generating, by the block chain node, a token based on the access authorization notification; and sending, by the block chain node, an access authorization result to the first agent node, where the access authorization result includes an identifier of the token. In this way, after obtaining an identifier of the token from the first agent node, the second agent node may obtain, from the block chain node based on the identifier of the token, personal information corresponding to a to-be-accessed personal information field identifier, thereby implementing sharing of the personal information. Because the user only needs to perform unified authorization in an information sharing process, convenience of the sharing of the personal information can be effectively improved.

In this embodiment of this application, the foregoing information import method, information update method, and information sharing method may be used in combination in one solution, or respectively used in different solutions. This is not specifically limited. The following respectively describes the three methods by using specific embodiments (Embodiment 1, Embodiment 2, and Embodiment 3).

Embodiment 1: Information Import Method

Figure 2:
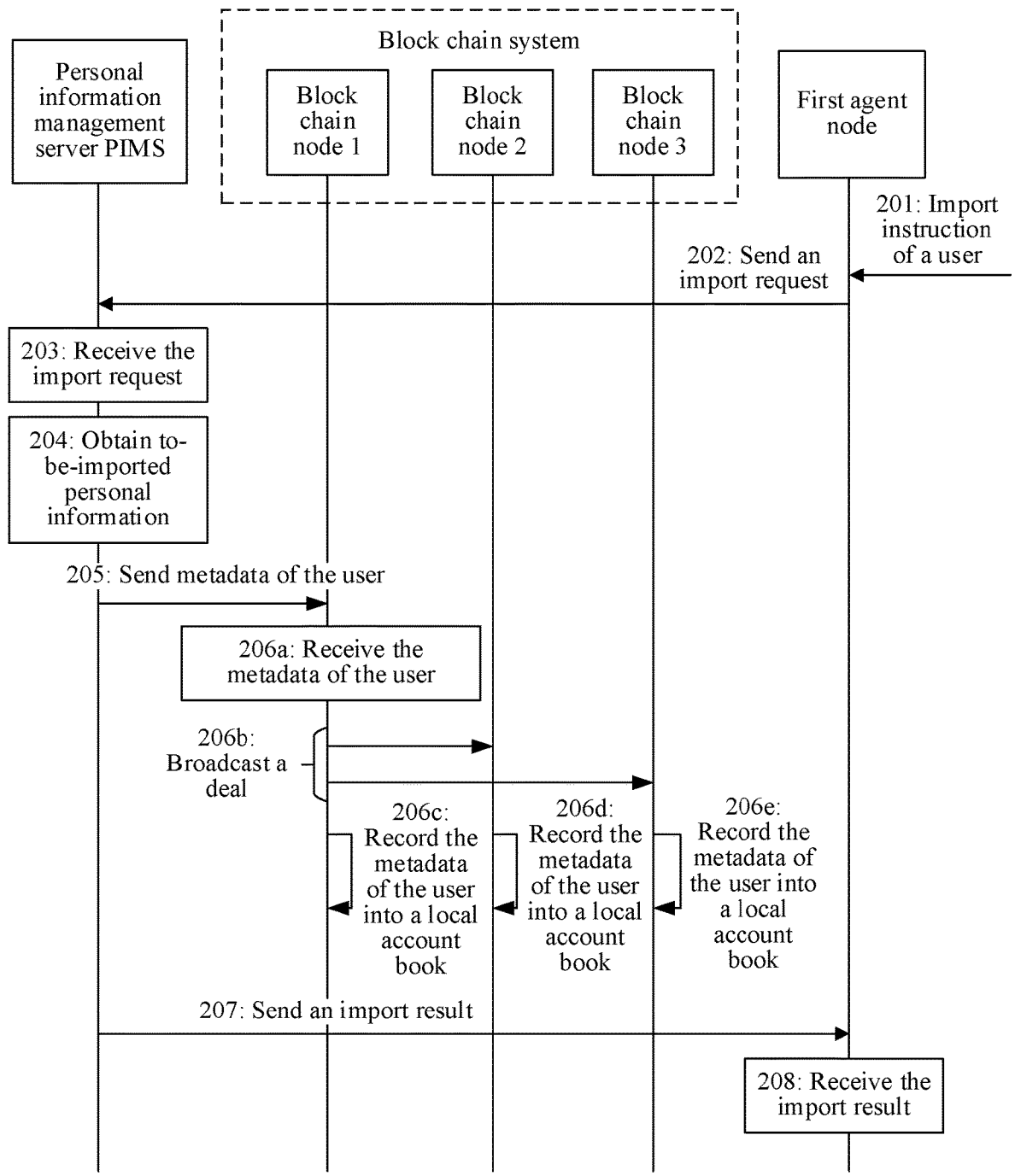
FIG. 2 is a schematic flowchart corresponding to an information import method according to an embodiment of this application.
Figure 4:
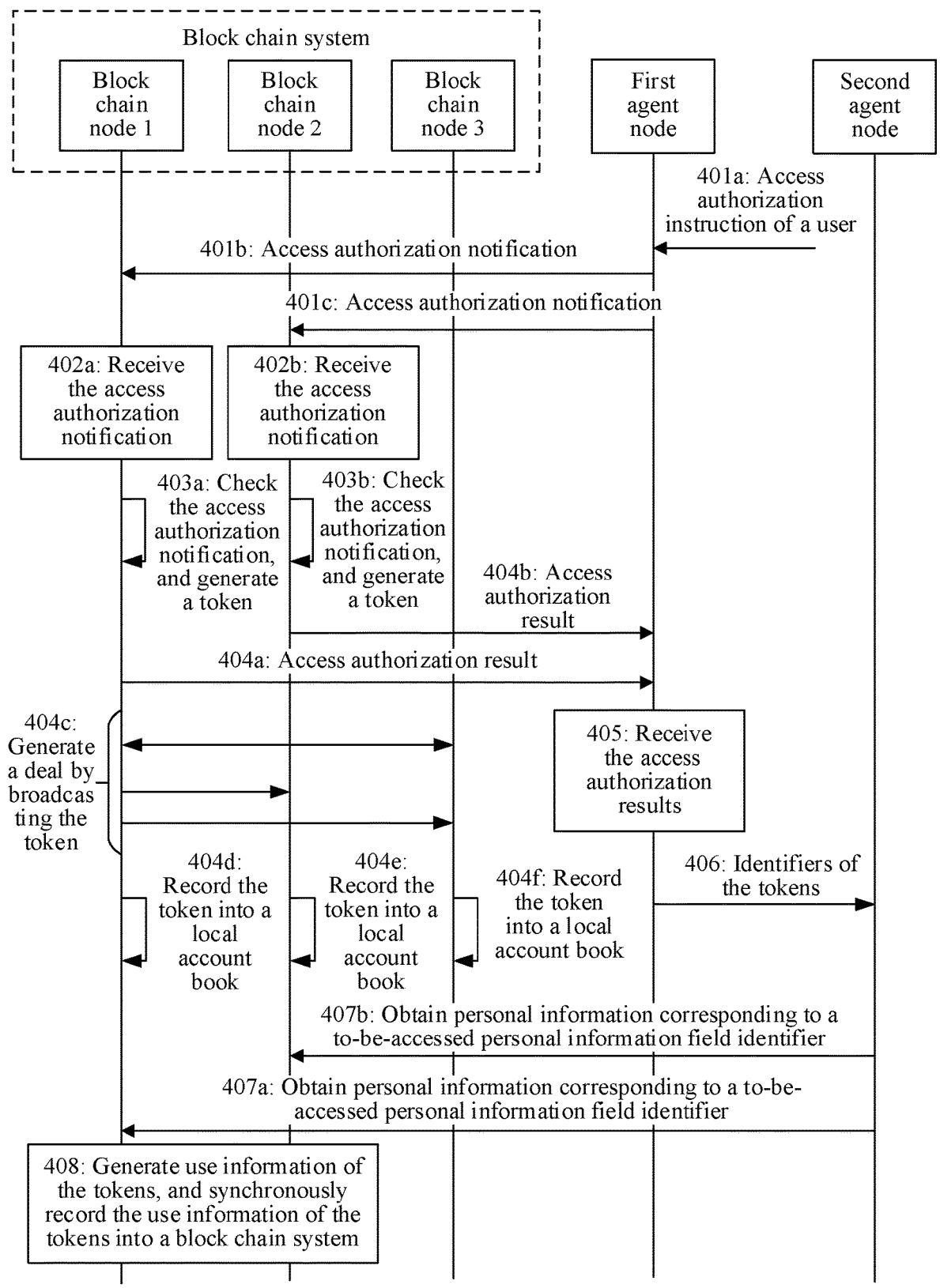
FIG. 4 is a schematic flowchart corresponding to an information sharing method according to an embodiment of this application.

FIG. 2 is a schematic flowchart corresponding to an information import method according to an embodiment of this application. As shown in FIG. 4, the method includes the following steps.

Step 201: A first agent node receives an import instruction of a user, where the import instruction includes an identifier corresponding to a PIMS.

Herein, the identifier corresponding to the PIMS may be specifically an identifier of a service provider corresponding to to-be-imported personal information.

For example, the user selects, by using the first agent node, personal information of the user to be imported into a bank A. In other words, the service provider corresponding to the to-be-imported personal information is the bank A. In this way, the first agent node receives the import instruction of the user, and the import instruction includes an identifier of the bank A.

Step 202: The first agent node sends an information import request to the PIMS, where the information import request includes a first identifier of the user.

Specifically, the first agent node may sign the information import request by using a digital certificate corresponding to the first identifier of the user.

In this embodiment of this application, the information import request may include authorization information of the user for the PIMS, and the authorization information includes any one of or any combination of authorization for importing personal information of the user into the block chain system, authorization for updating the personal information of the user to the block chain system, or authorization for removing the personal information of the user from the block chain system.

Further, the information import request specifically includes a to-be-imported personal information field identifier. The to-be-imported personal information field identifier may be obtained in the following manner: After the user selects the bank A by using the first agent node, the first agent node may present, to the user, a list of personal information field identifiers that can be provided by the bank A (or a PIMS of the bank A), and obtain the to-be-imported personal information field identifier based on the selection of the user. In this manner, the user may freely select personal information needing to be imported, so that a user requirement is easily satisfied, and there are relatively high flexibility and adaptability.

Herein, based on the foregoing example, the service provider corresponding to the to-be-imported personal information is the bank A, and correspondingly, the first agent node may send the information import request to the PIMS of the bank A.

Step 203: The PIMS receives the information import request sent by the first agent node.

Step 204: The PIMS obtains a second identifier of the user based on the information import request, and obtains, from the PIMS, to-be-imported personal information corresponding to the second identifier of the user.

Herein, a first possible implementation is: After receiving the information import request, the PIMS may obtain, based on the first identifier of the user and a pre-stored correspondence between the first identifier and the second identifier, the second identifier of the user corresponding to the first identifier of the user.

A second possible implementation is: after receiving the information import request, the PIMS displays a user login page of the bank A, and the user enters a user name/a password (namely, the second identifier of the user) registered in the bank A. After authentication succeeds, the PIMS confirms that the user is a registered valid user, and obtains the second identifier of the user.

In this embodiment of this application, when the personal information of the user is imported into the PIMS for the first time, because there is no correspondence between the first identifier and the second identifier of the user in the PIMS in this case, the second identifier of the user may be obtained by using the foregoing second possible implementation, and after the second identifier of the user is obtained, the correspondence between the first identifier and the second identifier of the user is established and stored. In this way, when the personal information of the user is subsequently imported, the foregoing first possible implementation may be used, and the user does not need to enter the registered user name/password, greatly improving convenience of a user operation.

Optionally, in this embodiment of this application, the information import request may also include the second identifier of the user. In this way, the PIMS may directly obtain the second identifier of the user from the information import request, thereby effectively improving efficiency of obtaining the second identifier by the PIMS, and reducing processing load of the PIMS.

It can be learned with reference to the foregoing description about the information import request that, there are two possible cases: (1) The information import request includes the first identifier of the user (and the second identifier of the user); (2) the information import request includes the first identifier of the user (and the second identifier of the user), and the to-be-imported personal information field identifier. The following specifically describes step 203 and step 204 separately for the two possible cases.

Case (1): The information import request includes the first identifier of the user (and the second identifier of the user).

If the information import request includes only the first identifier of the user, after receiving the information import request, the PIMS may obtain, based on the first identifier and the pre-stored correspondence between the first identifier and the second identifier, the second identifier of the user corresponding to the first identifier, and obtain the personal information of the user (namely, the to-be-imported personal information) based on the second identifier of the user. If the information import request includes the first identifier of the user and the second identifier of the user, the PIMS may directly obtain the personal information of the user (namely, the to-be-imported personal information) based on the second identifier of the user.

It can be learned from this that, in this case, after receiving the information import request, the PIMS uses, as the to-be-imported personal information, all personal information of the user locally stored in the PIMS.

Case (2): The information import request includes the first identifier of the user (and the second identifier of the user), and the to-be-imported personal information field identifier In this case, after receiving the information import request, the PIMS may obtain the personal information of the user in the manner (1) in the foregoing, and further select, with reference to the to-be-imported personal information field identifier, the to-be-imported personal information (which may be some personal information of the user) from the personal information of the user stored in the PIMS.

Step 205: The PIMS sends metadata of the user to at least one block chain node (such as a block chain node 1) in the block chain system, where the metadata of the user includes the to-be-imported personal information and the first identifier of the user.

Specifically, the PIMS may add a digital signature to the to-be-imported personal information, and obtain the metadata of the user based on the digital signature, the first identifier of the user, and identity information (such as a digital certificate and/or a name, and an ID of an SP corresponding to the PIMS) of a proving party of the personal information of the user. Further, the PIMS may perform security protection on the to-be-imported personal information. The security protection includes using a private key of the PIMS or generating a new encryption key to encrypt the personal information in an original plaintext, to generate encrypted personal information, or calculating a hash value of the to-be-imported personal information by using a hash algorithm, and store the encrypted personal information and/or the hash value to the metadata of the user.

In this embodiment of this application, the metadata of the user may further include an intelligent agreement identifier (such as an intelligent agreement identity (identification, ID)) of the plaintext of the personal information of the user, and subsequently the plaintext of the personal information of the user may be obtained based on the intelligent agreement ID by invoking a corresponding intelligent agreement. Certainly, the metadata of the user may also include another intelligent agreement ID for processing the personal information, for example, updating the intelligent agreement ID of the personal information. As described above, the metadata of the user may further include an identifier of a block chain node responsible for processing the metadata. The identifier of the block chain node may be a plurality of types of information that can uniquely identify the block chain node, for example, an ID or a URL address of the block chain node ID.

In an optional embodiment, after receiving the authorization information of the user for the PIMS, the PIMS may send the authorization information of the user for the PIMS and a signature of the first agent node to the block chain node. After authentication succeeds, the block chain node records the authorization information into a block chain ledger. Subsequently the block chain node may check, based on the authorization information of the user for the PIMS, whether the PIMS has a permission to perform a related operation, for example, check whether the PIMS has permissions to initiate a personal information import request, an update request, and a cancellation request.

It should be noted that, in a possible implementation, all nodes in the block chain system uniformly run a same intelligent agreement, for example, for obtaining the plaintext of the personal information, or updating the personal information. In this case, processing procedures of all block chain nodes and procedures of interaction with the PIMS are the same and standardized. In this manner, an intelligent agreement identifier and a block chain node identifier usually do not need to be maintained in the metadata of the user, and subsequently an agent node may directly invoke a standard intelligent agreement to perform a corresponding operation.

In another possible implementation, service providers may self-define private intelligent agreements as required, so that the service providers may implement private procedures of the service providers, invoke private interfaces of PIMSs of the service providers, and the like. In this case, corresponding intelligent agreements or even block chain nodes (usually in this case, the SPs can install and run the private intelligent agreements of the SPs in block chain nodes of the SPs) need to be specified in the metadata of the user.

In this embodiment of this application, an embodiment of the metadata is shown in the following:

```
{
    ID: user_id1,
    name: encrypt(user_name), signature(user_name),
    loan: encrypt(loan_record), signature(loan_record),
    reference: certificate,
    access: chaincode_access,
    update: chaincode_update,
    peer: peer1
}
``` where the ID field includes the first identifier of the user, and is used to indicate the user corresponding to the metadata; the name field and the loan field include a user name and a loan record that are encrypted, and the digital signature for the personal information; the reference field includes a digital certificate of an SP corresponding to the PIMS, and is used to indicate that the personal information is provided and checked by the service provider; the access field and the update field respectively include intelligent agreement identifiers for obtaining original information and updated information; and the peer field includes a block chain node responsible for processing the metadata.

Step 206a: the block chain node 1 receives the metadata of the user sent by the PIMS. Step 206b: the block chain node 1 broadcasts a deal. Step 206c: the block chain node 1 records the metadata of the user into a local ledger. Step 206d: a block chain node 2 records the metadata of the user into a local ledger. Step 206e: a block chain node 3 records the metadata of the user into a local ledger. The metadata of the user is registered in the block chain system in this manner.

Specifically, after receiving the metadata of the user sent by the PIMS, a block chain node checks the metadata of the user, for example, checks whether a data format is correct, or whether the first identifier of the user corresponds to a valid block chain user. After the check succeeds, the block chain node broadcasts this deal, and records the metadata of the user into local ledgers of all block chain node.

Further, that a block chain node checks the metadata of the user further includes checking whether a public attribute of the metadata is consistent with a public attribute in another piece of registered metadata of the same user, for example, whether names and identity card numbers registered in the bank A and a bank B by the user are the same. When there is an inconsistency, a check failure is returned, thereby effectively ensuring that the metadata registered in the block chain system is true and accurate metadata.

As described in the foregoing system architecture, a PIMS may be bound to a specified block chain node. For example, the bank A provides both a PIMS and a block chain node. In this case, the PIMS sends the metadata of the user to the corresponding block chain node. Alternatively, there may be no binding relationship between a PIMS and a block chain node. In this case, the PIMS may select and send the metadata of the user to any trustworthy block chain node, or even directly broadcast the metadata of the user to a plurality of block chain nodes.

Communication between a participant (such as a PIMS) of the block chain system and a block chain node is in the prior art of block chain solutions. Similarly, how block chain nodes reach a consensus to ensure synchronization of local ledger data is also in the prior art of the block chain system, and is not limited herein in this application.

Step 207: the PIMS sends an import result to the first agent node.

Herein, the PIMS may first check whether the to-be-imported personal information is registered in the block chain system, and return an import result of an import success to the first agent node after determining that the to-be-imported personal information is registered in the block chain system; or if no registration record of the to-be-imported personal information is found within a specified time length, step 205 and step 206 may be cyclically performed, until the to-be-imported personal information is registered in the block chain system.

Step 208: The first agent node receives the import result returned by the PIMS.

It should be noted that: (1) on one hand, the agent node may repeat the foregoing step procedure, so that the personal information of the user is imported by using different PIMSs; on the other hand, the foregoing step procedure describes a personal information import process by using only the first agent node as an example, and for any other agent node, the personal information of the user may be imported by referring to the foregoing procedure.

(2) In this embodiment of this application, the premise for the foregoing step procedure of importing the personal information is that the user is already registered in the block chain system; specific implementation of a user registration process is not limited in this embodiment of this application; a possible implementation is: the user is registered with a digital authentication server of a block chain by using the first agent node, and the digital authentication server generates a digital certificate and a corresponding private key and sends the digital certificate and the corresponding private key to the first agent node; and the first agent node locally stores the digital certificate and the private key. As an identity identifier of the user in the block chain system, the digital certificate is used in user authentication, and an ID of the digital certificate is the first identifier of the user.

In the foregoing information import procedure, after receiving the import request of the first agent node, the PIMS obtains the to-be-imported personal information, and sends the metadata of the user to the at least one block chain node in the block chain system, so that the metadata of the user is stored to the block chain system. In this way, because the personal information of the user is stored in the block chain system, security of the personal information can be effectively ensured, PIMSs of different SPs can jointly provide an external unified personal information service, and further, the user can also perform management of and provide external authorized access to the personal information of the user in a unified manner, effectively resolving a problem in the prior art that the user needs to separately authorize a plurality of agencies, consequently causing information sharing to be relatively inconvenient.

Embodiment 2: Information Update Method

Figure 3:
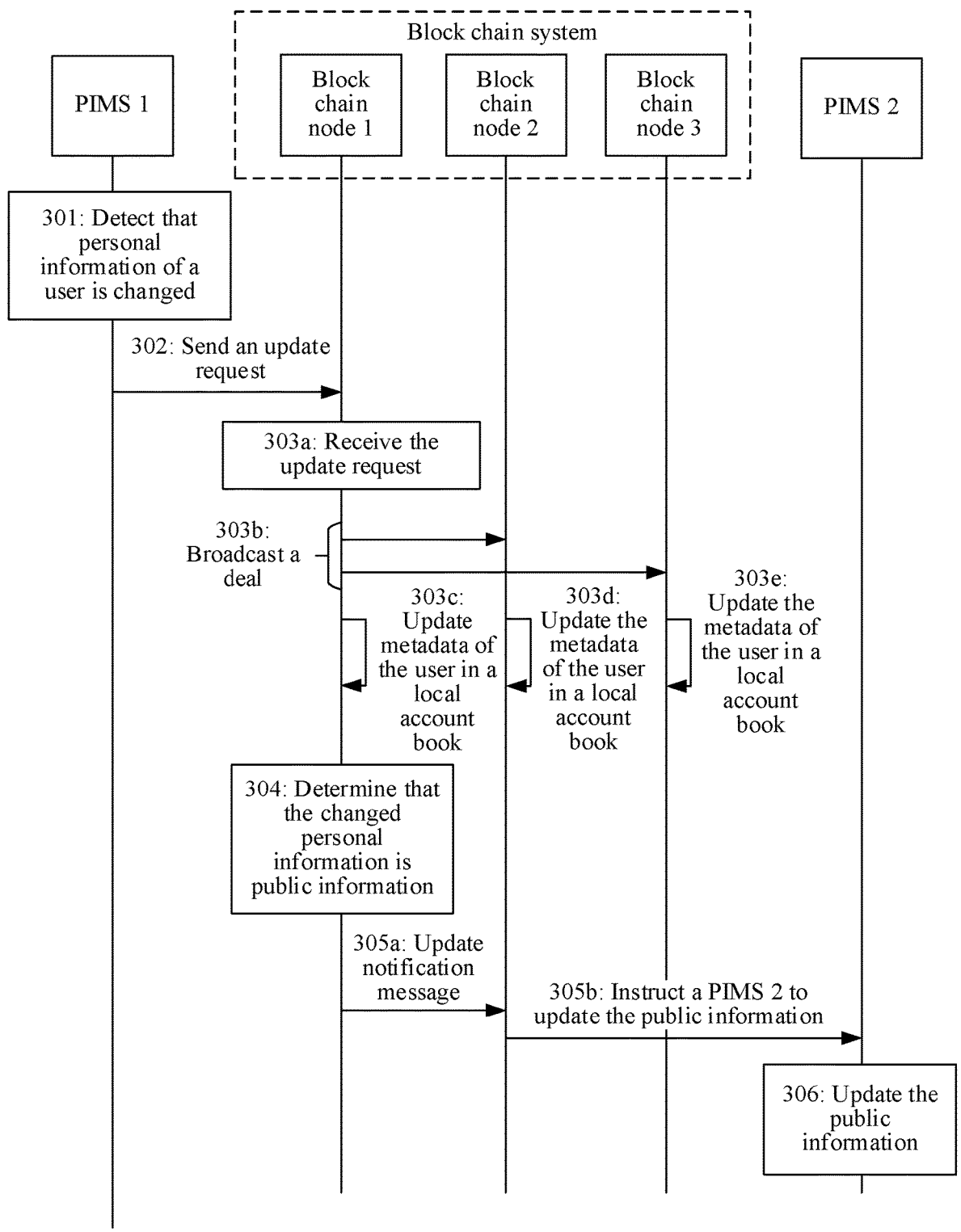
FIG. 3 is a schematic flowchart corresponding to an information update method according to an embodiment of this application.

FIG. 3 is a schematic flowchart corresponding to an information update method according to an embodiment of this application. As shown in FIG. 3, the method includes the following steps.

Step 301: After detecting that personal information of a user is changed, a PIMS determines whether a personal information field identifier corresponding to the changed personal information is registered in a block chain system, and if yes, step 302 is performed; or if not, the procedure is ended.

The personal information of the user may be registered in the block chain system in a plurality of manners, for example, in the manner described in Embodiment 1. The personal information field identifier corresponding to the changed personal information may be some or all of personal information field identifiers registered in the block chain system, and is specifically not limited.

For example, the user applies for a new load in a bank A, and a PIMS of the bank A finds, from a local record, that the user already registers, in the block chain system, a field identifier corresponding to load information. In this case, a subsequent information update procedure needs to be performed to update the loan information. If the user does not register, in the block chain system, the field identifier corresponding to the load information, the procedure is ended.

Step 302: The PIMS sends an update request to a block chain node, where the update request includes the changed personal information and a first identifier of the user.

Herein, the PIMS may obtain, from the PIMS, based on a second identifier of the user and a pre-stored correspondence between the first identifier and the second identifier, the first identifier corresponding to the second identifier of the user, and sends the update request to the block chain node.

Optionally, the update request may further include a digital signature of the PIMS for the changed personal information. In this way, subsequently, after receiving the update request, the block chain node may determine, based on stored authorization information of the user, whether the PIMS has an update permission, thereby effectively preventing an unauthorized update, and ensuring update reasonableness.

Optionally, the update request may further include an update type, and the update type is adding data and/or changing data. For example, for information about a loan newly applied for by the user, the update type is adding data; and for a new user credit score calculated by a bank based on user behavior, the update type is changing data. In this way, subsequently, after receiving the update request, the block chain node may determine a corresponding operation based on the update type, and quickly perform the operation.

As described in the foregoing system architecture, a PIMS may be bound to a specified block chain node (such as a block chain node 1). For example, the bank A provides both a PIMS and the block chain node 1, and in this case, the PIMS sends the update request to the corresponding block chain node 1.

Step 303a: the block chain node 1 receives the update request. Step 303b: the block chain node 1 broadcasts a deal. Step 303c: the block chain node 1 updates metadata of the user in a local ledger. Step 303d: a block chain node 2 updates the metadata of the user in a local ledger. Step 303e: a block chain node 3 updates the metadata of the user in a local ledger.

Herein, after receiving the update request, the block chain node checks the update request, including checking whether a data format is correct, whether the personal information field identifier corresponding to the changed personal information exists in the local ledger, and the like. Further, if the block chain node pre-stores second authorization information (to be specific, authorization for updating the personal information by the PIMS) of the user, the block chain node may check the update request of the PIMS based on the second authorization information, to be specific, check whether the PIMS has a permission to update the personal information. After checks of all items succeed, the block chain node records new personal information into the local ledger, and completes ledger information synchronization between block chain nodes. Similarly, how to synchronously record information into distributed local ledgers of all block chains is the prior art of the block chain system, and is not limited herein in this application.

Specifically, the block chain nodes (the block chain node 1, the block chain node 2, and the block chain node 3) obtain the metadata of the user based on the first identifier of the user, and update the metadata of the user based on the changed personal information. Further, the updating the metadata of the user may be adding data to the metadata of the user (where in this case, the update type is adding data), or replacing a piece of data in the metadata of the user with new data (where in this case, the update type is changing data). For example, if the changed personal information is information about a loan newly applied for by the user, the information about a loan newly applied for may be added to the metadata of the user; or if the changed personal information is a new user credit score calculated by a bank, a previous user credit score in the metadata of the user may be replaced with the new user credit score.

In this embodiment of this application, the foregoing method may further include the following steps:

Step 304: the block chain node 1 determines whether the changed personal information is public information, in other words, whether the changed personal information is included in metadata of the same user provided by another PIMS, and if yes, step 305 is performed; otherwise, the procedure is ended.

Step 305a: the block chain node 1 sends an update notification message to the block chain node 2. Step 305b: the block chain node 2 instructs a PIMS (such as the PIMS 2 shown in FIG. 3) storing the public information to update the public information.

Step 306: the PIMS 2 that receives the notification updates the public information.

As described above, PIMSs may add an intelligent agreement identifier of the update notification message and a corresponding block chain node identifier to metadata of the user respectively generated by the PIMSs, so that the block chain node 1 may invoke an intelligent agreement from the corresponding block chain node 2 based on a block chain node identifier corresponding to the update notification message, and the block chain node 2 runs the intelligent agreement to interact with the PIMS 2, to notify the information update. After receiving the update notification message, the PIMS 2 may directly update stored personal information, or prompt the user to confirm whether to update the information. Processing behavior of a PIMS after the PIMS receives the update notification message is not limited in this application.

In an optional embodiment, if the PIMS determines that the personal information field identifier corresponding to the changed personal information is not registered in the block chain system, the PIMS may provide first prompt information about whether to import the generated personal information to the block chain system, and send an update request to the block chain node after receiving an import allowing instruction of the user. Specifically, the PIMS may send second prompt information in an out-of-band manner (such as a short message service message or an e-mail) or in an inband manner (such as directly sending a message to an agent node of the user), to prompt the user whether to import the changed information to the block chain system. If the user chooses to import the changed information, the PIMS may perform an import procedure for the information; or if the user chooses not to import the changed information, the PIMS may locally record that the user does not import the information, and does not repeatedly notify the user when the information is changed for the next time.

It should be noted that FIG. 3 only shows a schematic example of a possible sequence of performing steps. This is not specifically limited in this application.

In the foregoing information update procedure, after detecting that the personal information of the user is changed, the PIMS may actively trigger an update procedure, so that the changed personal information is updated to the block chain system, effectively ensuring consistency between personal information stored in the block chain system and actual information; and because the PIMS may trigger the update procedure after detecting that the personal information is changed, the personal information is updated in a relatively timely manner, improving user experience.

Embodiment 3: Information Sharing Method

FIG. 4 is a schematic flowchart corresponding to an information sharing method according to an embodiment of this application. As shown in FIG. 4, the method includes the following steps.

Step 401a: a first agent node receives an access authorization instruction of a user. Step 401b: the first agent node sends an access authorization notification to a block chain node 1. Step 401c: the first agent node sends an access authorization notification to a block chain node 2.

Specifically: (1) for that a first agent node receives an access authorization instruction of a user, a first possible implementation is as follows. A second agent node sends an authorization request to the first agent node, where the authorization request may include a to-be-authorized personal information field identifier; and correspondingly, the first agent node receives the authorization request, and provides, based on the authorization request, second prompt information about whether to allow authorized access. The second prompt information is used to prompt the user to confirm whether to perform authorization. There may be a plurality of forms of providing the second prompt information. For example, the first agent node displays the second prompt information to the user in a form of a pop-up interface. If the user sends an access authorization instruction based on the second prompt information, correspondingly the first agent node may receive the access authorization instruction of the user, and perform a subsequent procedure; or if the user sends an access non-authorization instruction based on the second prompt information, correspondingly the first agent node may receive the access non-authorization instruction of the user, and end the procedure.

In this embodiment of this application, the access authorization instruction sent by the user may include a personal information field identifier that is authorized by the user to be accessed. In other words, when providing the second prompt information, the first agent node may display the to-be-authorized personal information field identifier to the user. If the user does not want to perform authorization for all to-be-authorized personal information field identifiers, the user may select, from the to-be-authorized personal information field identifiers, a personal information field identifier to which authorized access is allowed, and notify the personal information field identifier to the first agent node by using the access authorization instruction. In this way, when the user determines to perform authorization, if the user performs authorization for all personal information that needs to be accessed and that is selected by the second agent node, a personal information field identifier that is authorized by the user to be accessed is consistent with a to-be-authorized personal information field identifier; or if the user performs authorization for only some of personal information that needs to be accessed and that is selected by the second agent node, personal information field identifiers that are authorized by the user to be accessed are only some of to-be-authorized personal information field identifiers.

Further, after the first agent node receives the authorization request, the first agent node and the second agent node may exchange digital certificates with each other, to complete identity authentication of each other, and the first agent node may provide the second prompt information based on the authorization request only after the first agent node and the second agent node determine each other as a valid agent node.

A second possible implementation is: the user directly operates the first agent node to perform authorized access to personal information of the user, and in this way, the first agent node may receive the access authorization instruction of the user, and perform a subsequent procedure.

In the foregoing content, the first possible implementation is an authorization procedure that is triggered when the second agent node determines the personal information of the user. For example, the second agent node is an online bank client application of a bank C, the user applies for a loan by using the second agent node, and the bank C wants to view a loan record of the user in another bank (such as a bank A or a bank B). Therefore, the second agent node sends an authorization request to the first agent node, thereby triggering the authorization procedure. The second possible implementation is an authorization procedure that is triggered when the user personally determines the personal information of the user. For example, when the user transacts a service on a counter of the bank A, the user may operate a mobile phone client application (the first agent node) of the user to perform authorized access to the personal information of the user, thereby triggering the authorization procedure. During specific implementation, there may be another implementation. This is not specifically limited in this application.

Further, in the first possible implementation, before the second agent node sends the authorization request to the first agent node, the second agent node may further obtain metadata of the user. The metadata of the user includes the personal information of the user, and the metadata of the user does not include plaintext personal information, in other words, the personal information in the metadata of the user is in an encrypted state, and the personal information field identifier may be in a plaintext state. Therefore, the metadata of the user may be openly accessed. After obtaining the metadata of the user, the second agent node may learn of, based on the personal information field identifier in the plaintext state, personal information (for example, whether there is a loan record of another bank) that the user has, and select a personal information field identifier needing to be accessed. Herein, the personal information field identifier that needs to be accessed and that is selected by the second agent node is a to-be-authorized personal information field identifier.

In this embodiment of this application, the second agent node may obtain the metadata of the user in a plurality of manners. For example, the second agent node sends a metadata request to the first agent node, and the metadata request is used to request the metadata of the user. Correspondingly, after receiving the metadata request, the first agent node sends the metadata of the user to the second agent node based on the metadata request; or the first agent node sends the first identifier of the user registered in the block chain system to the second agent node based on the metadata request. In this way, the second agent node may obtain the metadata of the user from the block chain system based on the first identifier.

(2) For that the first agent node sends an access authorization notification to a block chain node, a possible implementation may be: the metadata of the user includes a personal information field identifier and an identifier of a corresponding block chain node. In this way, the first agent node may determine, by parsing the metadata of the user, which block chain nodes (such as the block chain node 1 and the block chain node 2) are processing nodes corresponding to a personal information field identifier that is authorized by the user to be accessed, and then send access authorization notifications to the determined block chain nodes. Another possible implementation may be: The first agent node directly broadcasts an access authorization notification to each block chain node in the block chain system; or presets a binding relationship between the first agent node and one or more block chain nodes. In this way, the first agent node may send an access authorization notification to a block chain node bound to the first agent node.

Herein, the access authorization notification is specifically described. The access authorization notification may include an access permission for the personal information of the user and the personal information field identifier that is authorized by the user to be accessed. The access permission for the personal information of the user includes any one of or any combination of the following: (1) an identifier of an authorized agent node, where the identifier may be specifically personal information that is of the second agent node and that is authorized by the user to be accessed, such as a digital certificate or a public key of the second agent node, so that in a subsequent step, it is conveniently determined, based on the information, whether an access requesting party is an allowed agent node; or (2) an authorization type, where specific content included in the authorization type is not specifically limited, for example, may include one or more of a quantity of times of authorized access (for example, access is allowed only for one time), an authorized access time (for example, a validity period is 10 minutes), and an identity authorized with access (for example, only access by a specified user is allowed). Further, the access authorization notification may further include a signature added by the first agent node by using a private key of the user to personal information authorized by the user to be accessed, to conveniently prove that the authorization is authorization from the user.

Step 402a: the block chain node 1 receives the access authorization notification sent by the first agent node. Step 402b: the block chain node 2 receives the access authorization notification sent by the first agent node.

Step 403a: the block chain node 1 generates a token based on the access authorization notification. Step 403b: the block chain node 2 generates a token based on the access authorization notification.

Herein, the access authorization notification may include the access permission for the personal information of the user, and further, the access authorization notification may further include the personal information field identifier that is authorized by the user to be accessed. After determining that the personal information field identifier that is authorized by the user to be accessed is registered in the block chain system, the block chain node generates the token based on the personal information field identifier that is authorized by the user to be accessed and that is in the access authorization notification.

Specifically, after receiving the access authorization notification, the block chain node runs an intelligent agreement, and checks the access authorization notification. Based on the foregoing description of the content included in the access authorization notification, in this embodiment of this application, in addition to checking whether the personal information authorized by the user to be accessed exists in the block chain system, the block chain node may further check whether a digital signature of the user in the access authorization notification is valid, whether authorization behavior is abnormal (such as frequent initiation of authorization), whether personal information for which authorization is requested exists, and whether a digital certificate of an authorized party is valid, and generate the token after checks of all items succeed. The intelligent agreement is that same code is run on different block chain nodes, thereby ensuring that when a plurality of block chain nodes receive a same access authorization notification, according to same processing logic, if all requests pass checks of the block chain nodes, tokens generated by these block chain nodes are consistent.

Herein, the token is specifically described: The token may include an identifier of the token, and may further include any one of or any combination of the following: (1) the first identifier of the user, and the personal information field identifier that is authorized by the user to be accessed; (2) a signature of the user for the authorization information; or (3) the access permission for the personal information of the user. For specific content, refer to the foregoing descriptions.

Step 404a: the block chain node 1 sends an access authorization result to the first agent node, where the access authorization result includes an identifier of the token. Step 404b: the block chain node 2 sends an access authorization result to the first agent node, where the access authorization result includes an identifier of the token.

Herein, if checking the access authorization notification by the block chain node succeeds, the token is generated, and the sent access authorization result includes the identifier of the token; or if checking the access authorization notification by the block chain node fails, an authorization failure is returned.

In this embodiment of this application, after the block chain node sends the access authorization result to the first agent node, the method may further include: Step 404c: the block chain node generates a deal by broadcasting the token. Step 404d: the block chain node 1 records the token into a distributed local ledger of a block chain. Step 404e: the block chain node 2 records the token into a distributed local ledger of a block chain. Step 404f: the block chain node 3 records the token into a distributed local ledger of a block chain. A specific implementation is the prior art of the block chain system, and is not limited in this application.

Step 405: the first agent node receives the access authorization results returned by the block chain nodes.

Herein, if any block chain node returns an authorization failure, the first agent node prompts the user that the authorization fails, and ends the entire procedure. If the plurality of block chain nodes all return access authorization notification results including identifiers of tokens, a subsequent procedure continues.

Step 406: the second agent node obtains the identifiers of the tokens from the first agent node.

Specifically, based on the first possible implementation in step 401, after receiving the access authorization results, the first agent node may send an authorization response message to the second agent node. The authorization response message includes the identifiers of the tokens. Correspondingly, the second agent node receives the authorization response message, and obtains the identifiers of the tokens.

Based on the second possible implementation in step 401, after receiving the access authorization results, the first agent node may generate corresponding two-dimensional barcodes based on the identifiers of the tokens. In this way, the second agent node may obtain the identifiers of the tokens by scanning the two-dimensional barcodes. Certainly, the generating corresponding two-dimensional barcodes based on the identifiers of the tokens is only an example of description. This is not specifically limited in this application.

Step 407a: the second agent node obtains, based on the identifiers of the tokens, from the block chain node 1, personal information corresponding to a to-be-accessed personal information field identifier. Step 407b: The second agent node obtains, based on the identifiers of the tokens, from the block chain node 2, personal information corresponding to a to-be-accessed personal information field identifier.

Figure 5:
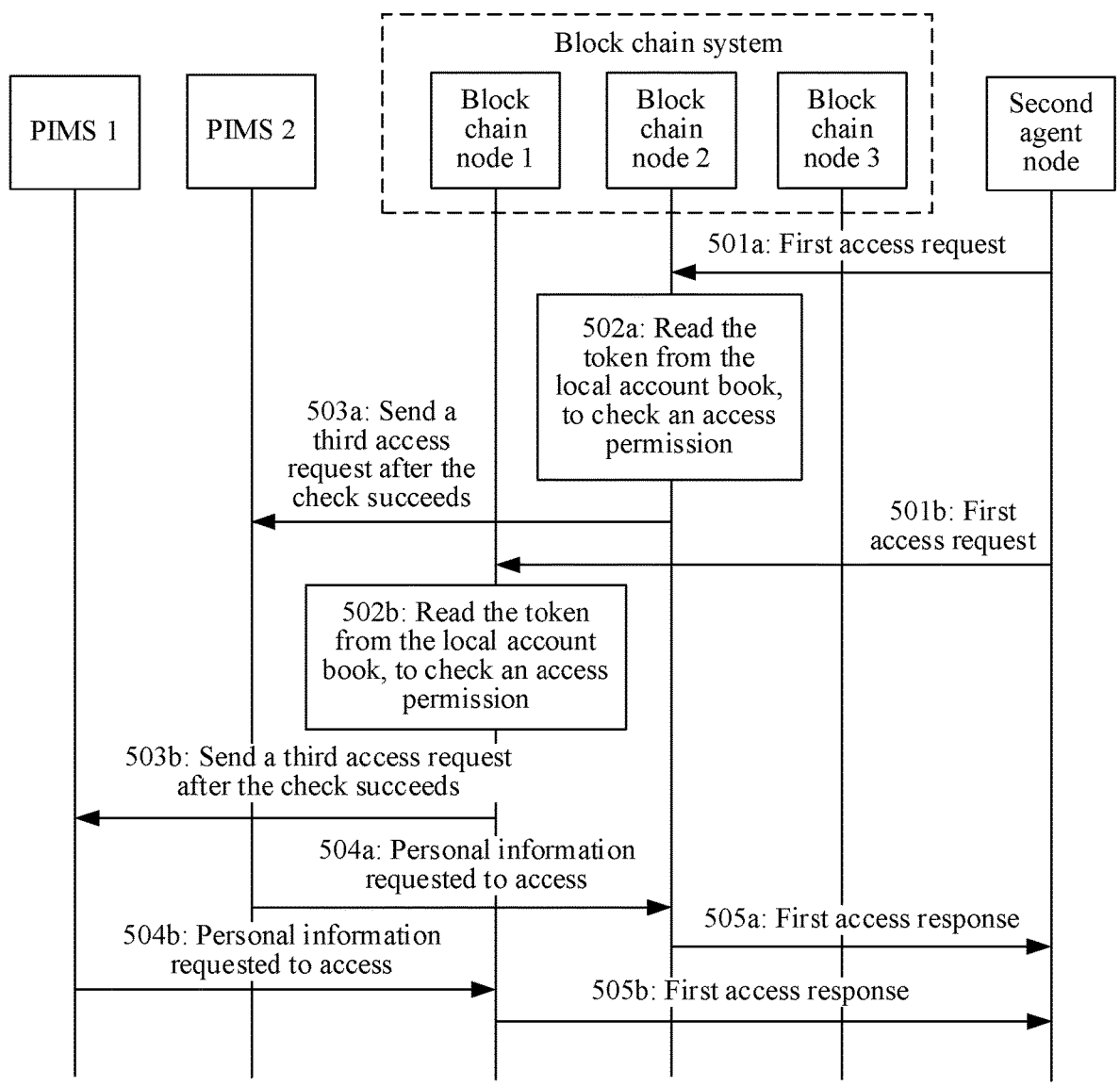
FIG. 5 is a schematic flowchart of obtaining personal information by a second agent node.

Specifically, a possible implementation is: the metadata of the user includes an intelligent agreement identifier for operating personal information and an identifier of a corresponding block chain node; briefly speaking, as described above, the metadata of the user includes the personal information field identifier and the identifier of the corresponding block chain node. In this case, FIG. 5 shows the following.

Step 501a: the second agent node sends a first access request to the block chain node 1. Step 501b: the second agent node sends a first access request to the block chain node 2.

Herein, the second agent node determines, by parsing the metadata of the user, at least one block chain node (for example, the block chain node 1 and the block chain node 2) corresponding to the to-be-accessed personal information field identifier, and sends a first access request to each block chain node in the at least one block chain node. The first access request includes a target personal information field identifier that corresponds to each block chain node and that is in the to-be-accessed personal information field identifier, and the identifiers of the tokens. Specifically, the first access request sent by the second agent node to the block chain node 1 includes a personal information field identifier corresponding to the block chain node 1, and the identifier of the token, and the first access request sent by the second agent node to the block chain node 2 includes a personal information field identifier corresponding to the block chain node 2, and the identifier of the token.

Step 502a: The block chain node 1 reads the token from the local ledger, to check an access permission, and if the check succeeds, step 503a is performed; or if the check fails, the procedure is ended. Step 502b: The block chain node 2 reads the token from the local ledger, to check an access permission, and if the check succeeds, step 503b is performed; or if the check fails, the procedure is ended.

Step 503a: the block chain node 1 sends a third access request to a PIMS 1. Step 503b: The block chain node 2 sends a third access request to a PIMS 2.

Herein, each block chain node (the block chain node 1 and the block chain node 2) sends a third access request to a target PIMS that provides personal information corresponding to the target personal information field identifier. The third access request includes the first identifier of the user and the target personal information field identifier. Specifically, the third access request sent by the block chain node 1 to the PIMS 1 includes the first identifier of the user and the personal information field identifier that corresponds to the block chain node 1; and the third access request sent by the block chain node 2 to the PIMS 2 includes the first identifier of the user and the personal information field identifier that corresponds to the block chain node 2.

Step 504a: the PIMS 1 obtains personal information requested to be accessed, and sends the personal information to the block chain node 1. Step 504b: the PIMS 2 obtains personal information requested to be accessed, and sends the personal information to the block chain node 2.

Herein, after receiving the third access request, the target PIMS (the PIMS 1 or the PIMS 2) obtains the personal information corresponding to the target personal information field identifier, and sends the personal information to the corresponding block chain node.

Step 505a: the block chain node 1 sends a first access response to the second agent node, where the first access response includes the received personal information that is requested to be accessed and that is sent by the PIMS 1. Step 505b: The block chain node 2 sends a first access response to the second agent node, where the first access response includes the received personal information that is requested to be accessed and that is sent by the PIMS 2.

Another possible implementation is: the metadata of the user does not include an intelligent agreement identifier for operating personal information and an identifier of a corresponding block chain node. In this case, the second agent node sends a second access request to any block chain node. The second access request includes personal information corresponding to the to-be-accessed personal information field identifier, and the identifier of the token. Correspondingly, after receiving the second access request, the any block chain node reads the token from the local ledger, to check an access permission, and after the check succeeds, obtains corresponding personal information from a PIMS that provides the personal information corresponding to the to-be-accessed personal information field identifier, and sends the corresponding personal information to the second agent node by using a second access response.

It should be noted that: (1) the first access request and the second access request may further include a digital signature of the second agent node for the to-be-accessed personal information field identifier, or other information. This is not specifically limited. (2) In the foregoing content, the first access request is used as an example. The block chain node checks, based on the first access request, whether the first access request complies with the access permission included in the token. Specific check content may include any one of or any combination of the following: (1) whether the to-be-accessed personal information field identifier is included in the personal information field identifier that is authorized by the user to be accessed; (2) determining, based on the digital signature of the second agent node included in the first access request, whether the second agent node is a specified authorized party; or (3) whether the authorization type is complied with. Further, that the first access request complies with the access permission included in the token means that a check of all check content succeeds. For example, when the check content includes the foregoing three items, that the first access request complies with the access permission included in the token means that, the to-be-accessed personal information field identifier is included in the personal information field identifier that is authorized by the user to be accessed, it is determined, based on the digital signature of the second agent node included in the first access request, that the second agent node is the specified authorized party, and the authorization type is complied with (for example, the quantity of times of access, the access time, and the like are all valid).

Figure 6:
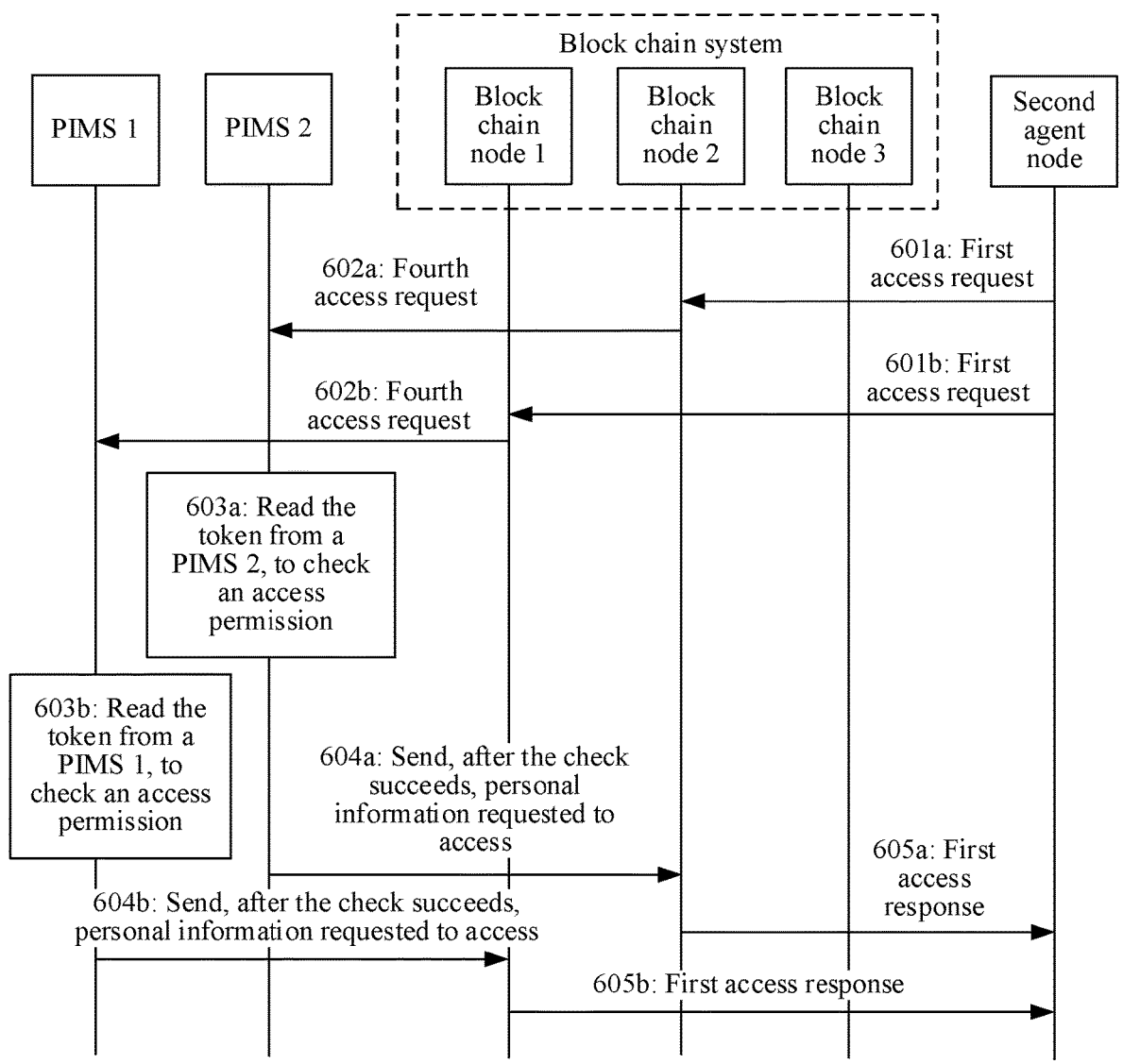
FIG. 6 is another schematic flowchart of obtaining personal information by a second agent node.

In the two possible implementations described above, an example in which a token is stored in a block chain node is used. In this case, the block chain node may directly obtain the token from a local ledger. Step 408 is subsequently described based on the two possible implementations. In another embodiment, after generating the tokens in step 403, the block chain nodes may alternatively send the tokens to corresponding PIMSs, and the corresponding PIMSs store the tokens. The block chain nodes do not store the tokens in the local ledgers any more. Using the procedure described above in FIG. 5 as an example, if the tokens are stored in the PIMSs corresponding to the block chain nodes, a specific execution procedure thereof may be changed to that in FIG. 6. As shown in FIG. 6, the method includes the following steps.

Step 601*a*: The second agent node sends a first access request to the block chain node 1. Step 601*b*: The second agent node sends a first access request to the block chain node 2.

Herein, the second agent node determines, by parsing the metadata of the user, at least one block chain node (for example, the block chain node 1 and the block chain node 2) corresponding to the to-be-accessed personal information field identifier, and sends a first access request to each block chain node in the at least one block chain node. The first access request includes a target personal information field identifier that corresponds to each block chain node and that is in the to-be-accessed personal information field identifier, and the identifiers of the tokens.

Step 602*a*: the block chain node 1 sends a fourth access request to a PIMS 1. Step 602*b*: The block chain node 2 sends a fourth access request to a PIMS 2.

Herein, after receiving the first access request, each block chain node (the block chain node 1 and the block chain node 2) sends a fourth access request to a target PIMS corresponding to each block chain node. The fourth access request may include the target personal information field identifier and the identifiers of the tokens.

Step 603*a*: the PIMS 1 reads the token, to check an access permission, and if the check succeeds, step 604*a* is performed; or if the check fails, the procedure is ended. Step 603*b*: the PIMS 2 reads the token, to check an access permission, and if the check succeeds, step 604*b* is performed; or if the check fails, the procedure is ended.

Herein, after receiving the fourth access request, the target PIMS (the PIMS 1 or the PIMS 2) reads the token from the target PIMS (for example, from the target PIMS locally) based on the identifier of the token, to check the access permission.

Step 604*a*: the PIMS 1 obtains personal information requested to be accessed, and sends the personal information to the block chain node 1. Step 604*b*: the PIMS 2 obtains personal information requested to be accessed, and sends the personal information to the block chain node 2.

Further, the target PIMS may update, in the target PIMS, use information of the token.

Step 605*a*: The block chain node 1 sends a first access response to the second agent node, where the first access response includes the received personal information that is requested to be accessed and that is sent by the PIMS 1. Step 605*b*: The block chain node 2 sends a first access response to the second agent node, where the first access response includes the received personal information that is requested to be accessed and that is sent by the PIMS 2.

In this manner, the tokens are stored in the PIMSs, and the PIMSs check the access permissions based on the tokens, so that processing load of the block chain nodes can be effectively reduced.

It should be noted that, after the PIMS 1 reads the token, for specific content of checking the access permission, refer to the foregoing content of checking the access permissions by the block chain nodes, and details are not described herein again.

Step 408: the block chain nodes generate use information of the tokens, and synchronously record the use information of the tokens into the block chain system.

Specifically, use information of the token for this time generated by a block chain node may include a use time, a quantity of use times, a use party, an accessed personal information field identifier, and the like, and is specifically not limited. In this embodiment of this application, synchronously recording the use information of the tokens into the block chain ledgers by the block chain nodes is the prior art of the block chain system, and details are not described herein.

Figure 7:
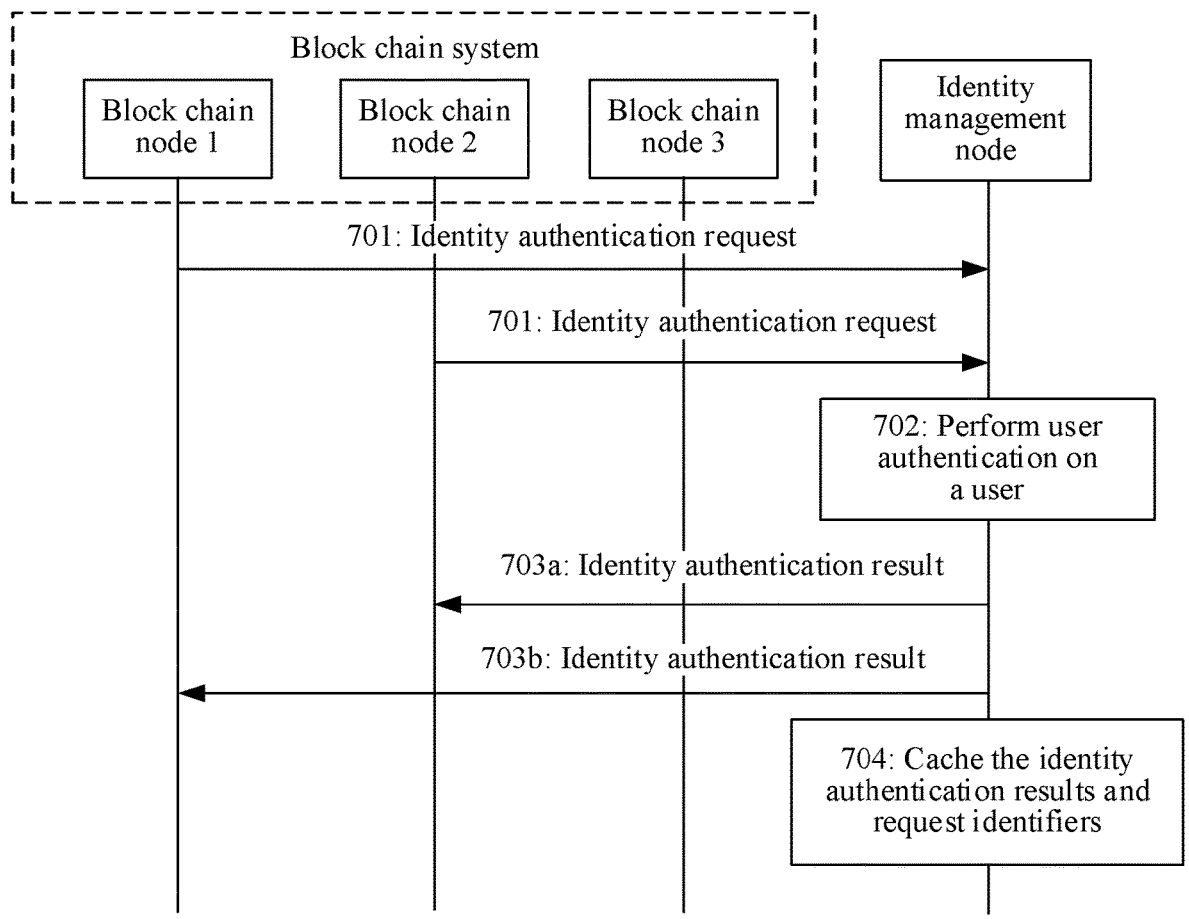
FIG. 7 is a schematic flowchart of user identity authentication according to an embodiment of this application.

It should be noted that, for step 403, a block chain node checks, by checking digital signature of the user, whether authorization is valid. However, if a private key of the user is obtained by a hacker, the hacker may impersonate the user to request information about the user. Therefore, when some key user information is involved, a block chain node in this embodiment of this application may invoke an identity authentication service of a block chain, to perform stricter identity authentication on the user, thereby ensuring accuracy of the identity authentication. For a specific procedure, refer to FIG. 7. FIG. 7 schematically shows, as an example, the block chain node 1 and the block chain node 2 that are schematically shown in FIG. 4. As shown in FIG. 7, the method includes the following steps.

Step 701: the block chain node 1 and the block chain node 2 send, respectively, an identity authentication request to an identity management node, where the identity management node is a node that is in the block chain system and that specially provides an identity service (such as identity authentication).

The identity authentication request includes the first identifier of the user or the digital certificate of the user. Further, the identity authentication request may further include a level of requested identity authentication. For example, for highly sensitive information such as a complete loan record, a high level of identity authentication (for example, biometric feature, such as a fingerprint, authentication) may be requested; for common information such as a credit rating, a relatively low level of identity authentication (such as dynamic short message service message confirmation). The level of identity authentication may be included in the metadata of the user, and may be recorded in a personal information import procedure by the PIMS into the metadata of the user based on a pre-configuration. When the user authorizes a plurality of pieces of personal information to be accessed, the identity authentication should be requested based on a highest level in the personal information authorized to be accessed.

Further, the identity authentication request further includes a request identifier, such as a deal ID (which may be generated by the first agent node in step 401, and included in the access authorization notification), and an identifier of a token. In this way, in step 702, when a plurality of identity authentication requests determined by the identity management node come from a same authorization procedure, the plurality of identity authentication requests may be identified based on request identifiers, thereby preventing repeated user authentication from being initiated and affecting user experience.

Step 702: the identity management node performs user authentication on the user, including but is not limited to: certificate authentication, dynamic short message service message authentication, biometric feature (such as a fingerprint, an iris, or a profile picture) authentication, and two-factor message authentication (for example, the user is requested to enter a two-factor authentication answer registered in advance, such as a birthday of a father).

Step 703*a*: the identity management node returns an identity authentication result to the block chain node 1. Step 703*b*: the identity management node returns an identity authentication result to the block chain node 2.

Step 704: the identity management node caches the authentication results and the request identifiers, so that when receiving an identity authentication request of a same request identifier in a caching phase, the identity management node may directly return a cached authentication result to a requesting party, improving identity authentication efficiency. The step may be an optional step.

In the foregoing information sharing procedure, the first agent node sends the access authorization notification to the block chain node, and the block chain node generates the token based on the access authorization notification, and sends the identifier of the token to the first agent node. In this way, the second agent node may obtain the identifier of the token from the first agent node, and obtain, from the block chain node based on the identifier of the token, personal information corresponding to a to-be-accessed personal information field identifier, thereby implementing sharing of the personal information. Because the user only needs to perform unified authorization in an information sharing process, convenience of the sharing of the personal information can be effectively improved.

For the foregoing method procedures, embodiments of this application further provide corresponding apparatuses. For specific implementation of the apparatuses, refer to the foregoing method descriptions.

Figure 8:
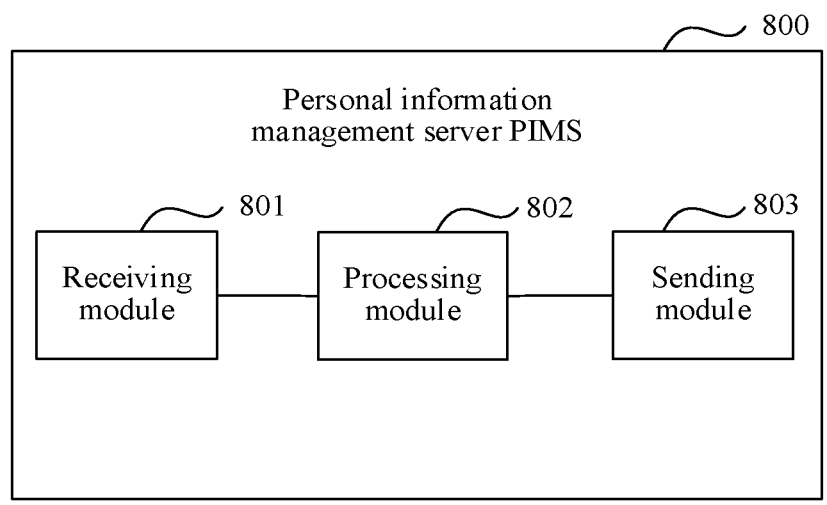
FIG. 8 is a schematic structural diagram of a PIMS according to an embodiment of this application.

Based on the foregoing embodiments, an embodiment of this application provides a PIMS, configured to implement corresponding procedures or steps performed by the PIMS in the foregoing information import method, information update method, and information sharing method. Referring to FIG. 8, the PIMS 800 may include: a receiving module 801, a processing module 802, and a sending module 803, specifically:

a receiving module 801, configured to receive an information import request sent by a first agent node, where the information import request includes a first identifier of a user, and the first identifier of the user is an identity identifier of the user in a block chain system;

a processing module 802, configured to: obtain a second identifier of the user based on the information import request, and obtain to-be-imported personal information corresponding to the second identifier of the user, where the second identifier of the user is an identity identifier of the user in the PIMS; and a sending module 803, configured to send metadata of the user to at least one block chain node in the block chain system, so that the at least one block chain node stores the metadata of the user to the block chain system, where the metadata of the user includes the to-be-imported personal information and the first identifier of the user.

In a possible design, the information import request further includes authorization information of the user for the PIMS, and the authorization information includes any one of or any combination of authorization for importing personal information of the user into the block chain system, authorization for updating the personal information of the user to the block chain system, or authorization for removing the personal information of the user from the block chain system.

In a possible design, the information import request further includes a to-be-imported personal information field identifier; and the processing module 802 is further configured to:

obtain personal information corresponding to the second identifier of the user, and obtain, based on the to-be-imported personal information field identifier, the to-be-imported personal information from the personal information corresponding to the second identifier of the user.

In a possible design, the processing module 802 is specifically configured to:

obtain, based on the first identifier of the user and a pre-stored correspondence between the first identifier of the user and the second identifier of the user, the second identifier of the user corresponding to the first identifier of the user; or obtain the second identifier of the user from the information import request, where the information import request further includes the second identifier of the user; or display a login page based on the information import request, and obtaining the second identifier of the user based on information entered on the login page by the user.

In a possible design, the sending module 803 is specifically configured to:

send, based on an identifier of a block chain node corresponding to the PIMS, the metadata of the user to the block chain node corresponding to the PIMS.

In a possible design, the processing module 802 is further configured to:

after detecting that the personal information of the user is changed, if determining that a personal information field identifier corresponding to the changed personal information is registered in the block chain system, send an update request to the block chain node by using the sending module 803, where the update request includes the changed personal information and the first identifier of the user.

In a possible design, the update request further includes an update type, and the update type is adding data and/or changing data.

Figure 9:
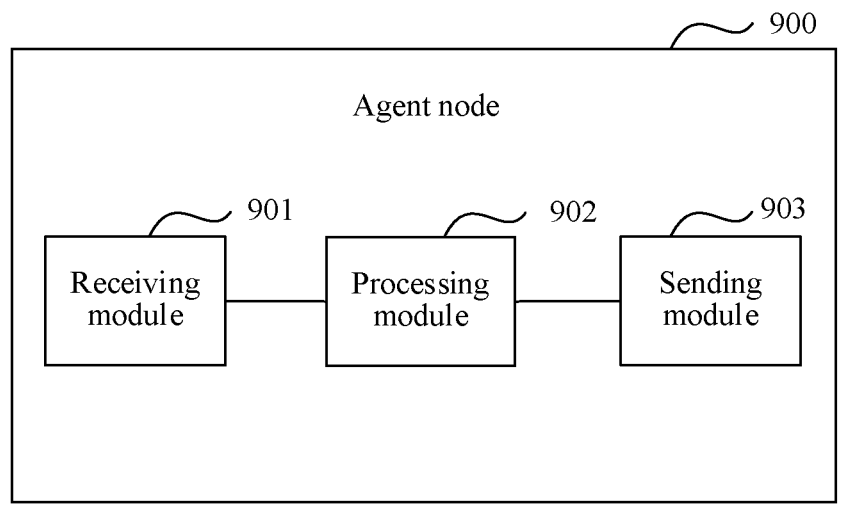
FIG. 9 is a schematic structural diagram of an agent node according to an embodiment of this application.

Based on the foregoing embodiments, an embodiment of this application provides an agent node, configured to implement corresponding procedures or steps performed by the agent node in the foregoing information import method, information update method, and information sharing method. Referring to FIG. 9, the agent node 900 may include: a receiving module 901 and a sending module 903, specifically:

the receiving module 901 is configured to receive an import instruction of a user, where the import instruction includes an identifier corresponding to a PIMS; and the sending module 903 is configured to send an information import request to the PIMS based on the identifier corresponding to the PIMS, where the information import request includes a first identifier of the user and authorization information of the user for the PIMS, the first identifier of the user is an identity identifier of the user in a block chain system, and the authorization information includes any one of or any combination of authorization for importing personal information of the user into the block chain system, authorization for updating the personal information of the user to the block chain system, or authorization for removing the personal information of the user from the block chain system.

In a possible design, the import request further includes a to-be-imported personal information field identifier; and the agent node further includes a processing module 902, and the processing module 902 obtains the to-be-imported personal information field identifier in the following manner:

obtaining, based on the identifier corresponding to the PIMS, a personal information field identifier provided by the PIMS, and presenting the personal information field identifier to the user; and obtaining the to-be-imported personal information field identifier based on a personal information field identifier selected by the user from the personal information field identifier provided by the PIMS.

In a possible design, after the receiving module 901 receives an access authorization instruction of the user, the sending module 903 is further configured to send an access authorization notification to a block chain node, where the access authorization notification includes an access permission for the personal information of the user;

the receiving module 901 is further configured to receive an access authorization result returned by the block chain node, where the access authorization result includes an identifier of a token generated by the block chain node based on the access authorization notification; and the processing module 902 is further configured to send the identifier of the token to a second agent node, so that the second agent node obtains to-be-accessed personal information from the block chain system based on the identifier of the token.

In a possible design, the access authorization notification further includes a personal information field identifier that is authorized by the user to be accessed; and the processing module 902 is further configured to: receive, by using the receiving module 901, an authorization request sent by the second agent node, and provide, based on the authorization request, second prompt information about whether to allow authorized access; and receive the access authorization instruction of the user, and obtain, based on the access authorization instruction, the personal information field identifier that is authorized by the user to be accessed.

In a possible design, before receiving the authorization request sent by the second agent node, the receiving module 901 is further configured to receive a metadata request sent by the second agent node, where the metadata request is used to request metadata of the user; and the sending module 903 is further configured to send the metadata of the user to the second agent node based on the metadata request; or send the first identifier of the user to the second agent node based on the metadata request, so that the second agent node obtains the metadata of the user from the block chain system based on the first identifier, where the metadata of the user includes a personal information field identifier of the user, and the metadata of the user is used by the second agent node to select, from the personal information field identifier of the user, a personal information field identifier needing to be accessed.

In a possible design, the sending module 903 is specifically configured to:

obtain metadata of the user, where the metadata of the user includes a personal information field identifier of the user and a block chain node corresponding to the personal information field identifier of the user;

obtain, based on the personal information field identifier that is authorized by the user to be accessed and the metadata of the user, a block chain node corresponding to the personal information field identifier that is authorized by the user to be accessed; and send the access authorization notification to the block chain node corresponding to the personal information field identifier that is authorized by the user to be accessed.

In a possible design, the access permission for the personal information of the user includes any one of or any combination of the following:

an identifier of an authorized agent node, a quantity of times of authorized access, or an authorized access time.

Figure 10:
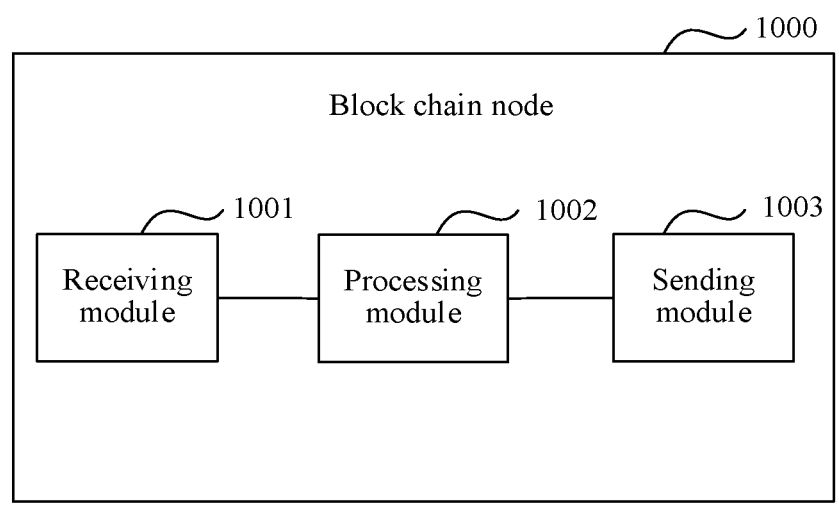
FIG. 10 is a schematic structural diagram of a block chain node according to an embodiment of this application.

Based on the foregoing embodiments, an embodiment of this application provides a block chain node, configured to implement corresponding procedures or steps performed by the block chain node in the foregoing information import method, information update method, and information sharing method. Referring to FIG. 10, the block chain node 1000 may include: a receiving module 1001, a processing module 1002, and a sending module 1003, specifically:

a receiving module 1001, configured to receive an access authorization notification sent by a first agent node, where the access authorization notification includes an access permission for personal information of a user;

a processing module 1002, configured to generate a token based on the access authorization notification; and a sending module 1003, configured to send an access authorization result to the first agent node, where the access authorization result includes an identifier of the token.

In a possible design, the access authorization notification further includes a personal information field identifier that is authorized by the user to be accessed; and the processing module 1002 is specifically configured to:

after determining that the personal information field identifier that is authorized by the user to be accessed is registered in the block chain system, generate the token based on the personal information field identifier that is authorized by the user to be accessed.

In a possible design, the receiving module 1001 is further configured to:

receive a first access request sent by a second agent node, where the first access request includes the identifier of the token and a to-be-accessed personal information field identifier; and the processing module 1002 is further configured to: after reading, from the block chain system based on the identifier of the token, the token corresponding to the identifier of the token, and determining that the first access request complies with an access permission included in the token, obtain personal information corresponding to the to-be-accessed personal information field identifier, and send the personal information to the second agent node by using the sending module 1003.

In a possible design, after the sending module 1003 sends the personal information corresponding to the to-be-accessed personal information field identifier to the second agent node, the processing module 1002 is further configured to: generate use information of the token, and record the use information of the token into the block chain system.

In a possible design, the access permission for the personal information of the user includes any one of or any combination of the following:

an identifier of an authorized agent node, a quantity of times of authorized access, or an authorized access time.

In a possible design, the receiving module 1001 is further configured to receive an update request sent by a PIMS, where the update request includes a first identifier of the user and changed personal information; and the processing module 1002 is further configured to: obtain metadata of the user based on the first identifier of the user, and update the metadata of the user based on the changed personal information.

In a possible design, the processing module 1002 is further configured to send an update notification message to a second block chain node in the block chain system by using the sending module 1003 after determining that the changed personal information is public information of the user, and the second block chain node instructs another PIMS storing the public information to update the public information.

It should be noted that, in this embodiment of this application, module division is an example of the application and is merely a logical function division. In actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 11:
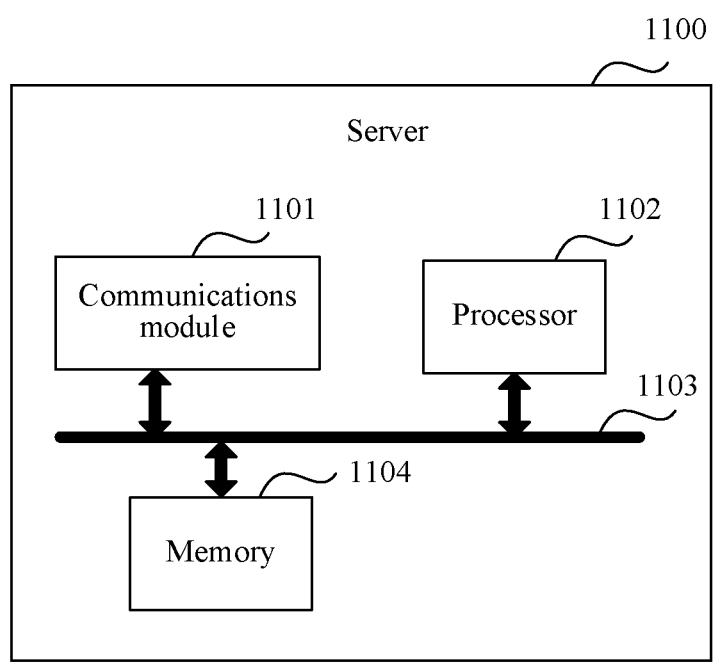
FIG. 11 is a schematic structural diagram of a server according to an embodiment of this application.

Based on the foregoing embodiments, an embodiment of this application further provides a server. The server may be the PIMS described in the foregoing. The server has functions of the PIMS 800 shown in FIG. 8. Referring to FIG. 11, the server 1100 includes: a communications module 1101 and a processor 1102, where the processor 1102 is configured to: obtain a second identifier of the user based on the information import request, and obtain to-be-imported personal information corresponding to the second identifier of the user, where the second identifier of the user is an identity identifier of the user in the PIMS; and the communications module 1101 is configured to communicate and interact with another device, for example, receive an information import request sent by a first agent node, where the information import request includes a first identifier of a user, and the first identifier of the user is an identity identifier of the user in a block chain system; and send metadata of the user to at least one block chain node in the block chain system, so that the at least one block chain node stores the metadata of the user to the block chain system, where the metadata of the user includes the to-be-imported personal information and the first identifier of the user.

The communications module 1101 may be a radio frequency (RF) circuit, a wireless fidelity (Wi-Fi) module, a communications interface, a Bluetooth module, or the like.

Optionally, the server 1100 may further include: the memory 1104, configured to store a program, or the like. Specifically, the program may include program code, and the program code includes an instruction. The memory may include a random access memory (RAM), or may be a non-volatile memory, for example, at least one magnetic disk memory. The processor 1102 executes the application program stored in the memory, to implement the foregoing functions.

In a possible manner, the communications module 1101, the processor 1102, and the memory may be connected to each other by using the bus 1103. The bus may be a peripheral component interconnect (PCI) bus, an extended industry standard architecture (extended industry standard architecture, EISA) bus, or the like. The bus may be classified into an address bus, a data bus, a control bus, and the like.

Figure 12:
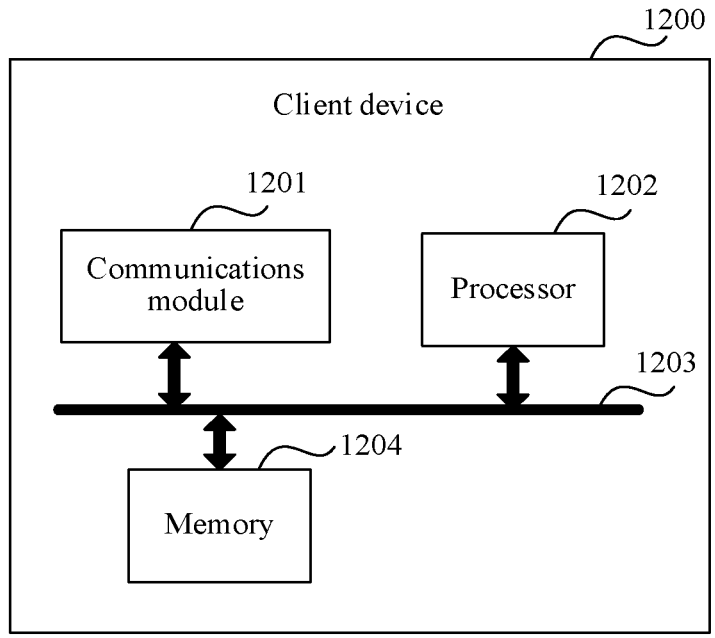
FIG. 12 is a schematic structural diagram of a client device according to an embodiment of this application.

Based on the foregoing embodiments, an embodiment of this application further provides a client device. The client device may be the agent node described in the foregoing. The client device has functions of the agent node 900 shown in FIG. 9. Referring to FIG. 12, the client device 1200 includes: a communications module 1201 and a processor 1202, where the processor 1202 is configured to implement the functions of the processing module in FIG. 9; and the communications module 1201 is configured to communicate and interact with another device, for example, receive an import instruction of a user, where the import instruction includes an identifier corresponding to a PIMS; and send an information import request to the PIMS based on the identifier corresponding to the PIMS.

The communications module 1201 may be an RF circuit, a Wi-Fi module, a communications interface, a Bluetooth module, or the like.

Optionally, the client device 1200 may further include: the memory 1204, configured to store a program, or the like. Specifically, the program may include program code, and the program code includes an instruction. The memory may include a random access memory (RAM), or may be a non-volatile memory ( ) for example, at least one magnetic disk memory. The processor 1202 executes the application program stored in the memory, to implement the foregoing functions.

In a possible manner, the communications module 1201, the processor 1202, and the memory may be connected to each other by using the bus 1203. The bus may be a peripheral component interconnect (peripheral component interconnect, PCI) bus, an extended industry standard architecture (extended industry standard architecture, EISA) bus, or the like. The bus may be classified into an address bus, a data bus, a control bus, and the like.

Figure 13:
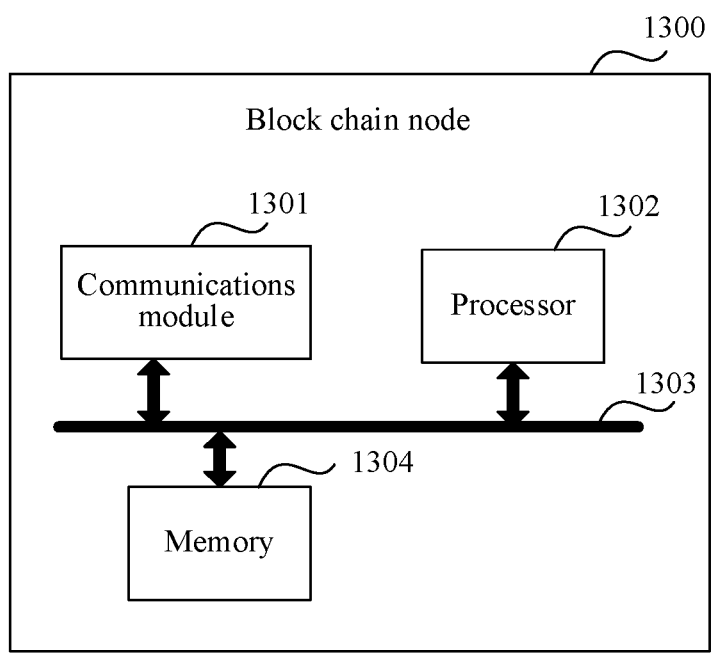
FIG. 13 is a schematic structural diagram of a block chain node according to an embodiment of this application.

Based on the foregoing embodiments, an embodiment of this application further provides a block chain node. The block chain node has functions of the block chain node 1000 shown in FIG. 10. Referring to FIG. 13, the block chain node 1300 includes: a communications module 1301 and a processor 1302, where the processor 1302 is configured to implement functions of the processing module in FIG. 10, including: generating a token based on the access authorization notification; and the communications module 1301 is configured to communicate and interact with another device, for example, receive an access authorization notification sent by a first agent node, where the access authorization notification includes an access permission for personal information of a user; and send an access authorization result to the first agent node, where the access authorization result includes an identifier of the token.

Optionally, the server 1300 may further include: the memory 1304, configured to store a program, or the like. Specifically, the program may include program code, and the program code includes an instruction. The memory may include a random access memory (RAM), or may be a non-volatile memory ( ) for example, at least one magnetic disk memory. The processor 1302 executes the application program stored in the memory, to implement the foregoing functions.

In a possible manner, the communications module 1301, the processor 1302, and the memory may be connected to each other by using the bus 1303. The bus may be a peripheral component interconnect (PCI) bus, an extended industry standard architecture (EISA) bus, or the like. The bus may be classified into an address bus, a data bus, a control bus, and the like.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (solid state disk, SSD)), or the like.

The embodiments of the present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to embodiments of the present invention without departing from the spirit and scope of this application. This application is intended to cover these modifications and variations provided that they fall within the scope of protection defined by the following claims and their equivalent technologies.

What is claimed is:

1. A method, applied to a personal information management server (PIMS), the method comprising:
   receiving an information import request sent by a first agent node, wherein the information import request comprises a first identifier of a user, and the first identifier of the user is an identity identifier of the user in a block chain system;
   obtaining a second identifier of the user based on the information import request, and obtaining to-be-imported personal information corresponding to the second identifier of the user, wherein the second identifier of the user is an identity identifier of the user in the PIMS; and
   sending metadata of the user to at least one block chain node in the block chain system, so that the at least one block chain node stores the metadata of the user into the block chain system, wherein the metadata of the user comprises the to-be-imported personal information and the first identifier of the user.

2. The method according to claim 1, wherein the information import request further comprises authorization information of the user for the PIMS, and the authorization information comprises at least one of: authorization for importing the personal information of the user into the block chain system, authorization for updating the personal information of the user to the block chain system, or authorization for removing the personal information of the user from the block chain system.

3. The method according to claim 1, wherein the information import request further comprises a to-be-imported personal information field identifier; and
   the obtaining to-be-imported personal information corresponding to the second identifier of the user comprises:
   obtaining personal information corresponding to the second identifier of the user, and obtaining, based on the to-be-imported personal information field identifier, the to-be-imported personal information from the personal information corresponding to the second identifier of the user.

4. The method according to claim 1, wherein the obtaining the second identifier of the user based on the information import request comprises:
  obtaining, based on the first identifier of the user and a pre-stored correspondence between the first identifier of the user and the second identifier of the user, the second identifier of the user corresponding to the first identifier of the user; or
  obtaining the second identifier of the user from the information import request, wherein the information import request further comprises the second identifier of the user; or
  providing a login page based on the information import request, and obtaining the second identifier of the user based on information entered on the login page by the user.

5. The method according to claim 1, wherein the sending metadata of the user to at least one block chain node in the block chain system comprises:
  sending, based on an identifier of a block chain node corresponding to the PIMS, the metadata of the user to the block chain node corresponding to the PIMS.

6. The method according to claim 1, wherein the method further comprises:
  after detecting that the personal information of the user is changed, if determining that a personal information field identifier corresponding to the changed personal information is registered in the block chain system, sending an update request to the block chain node, or if determining that a personal information field identifier corresponding to the changed personal information is not registered in the block chain system, providing first prompt information about whether to import the changed personal information into the block chain system, and sending the update request to the block chain node after receiving an import allowing instruction of the user, wherein
  the update request comprises the changed personal information and the first identifier of the user.

7. The method according to claim 6, wherein the update request further comprises an update type, and the update type is adding data and/or changing data.

8. A system, comprising:
  one or more agent nodes;
  a block chain system and
  one or more personal information management servers (PIMSs), wherein the block chain system comprises a plurality of block chain nodes;
  a first of the agent nodes is configured to: receive an import instruction of a user, wherein the import instruction comprises an identifier corresponding to one of the PIMSs; and send an information import request to the PIMS, wherein the information import request comprises a first identifier of the user, the first identifier of the user is an identity identifier of the user in the block chain system, and the first agent node is any agent node in the information management system;
  the PIMS receives an information import request sent by the first agent node, wherein the information import request comprises the first identifier of the user, and the first identifier of the user is the identity identifier of the user in the block chain system; obtains a second identifier of the user based on the information import request, and obtains to-be-imported personal information corresponding to the second identifier of the user, wherein the second identifier of the user is an identity identifier of the user in the PIMS; and sends metadata of the user to at least one of the block chain nodes in the block chain system, wherein the metadata of the user comprises the to-be-imported personal information and the first identifier of the user; and
  the block chain node is configured to: receive the metadata of the user sent by the PIMS, and store the metadata of the user into the block chain system.

9. A method, applied to a first agent node, the method comprising:
  receiving an import instruction of a user, wherein the import instruction comprises an identifier corresponding to a personal information management server (PIMS); and
  sending an information import request to the PIMS based on the identifier corresponding to the PIMS, wherein the information import request comprises a first identifier of the user and authorization information of the user for the PIMS, the first identifier of the user is an identity identifier of the user in a block chain system, and the authorization information comprises at least one of: authorization for importing personal information of the user into the block chain system, authorization for updating the personal information of the user to the block chain system, or authorization for removing the personal information of the user from the block chain system;
  sending an access authorization notification to a block chain node after receiving an access authorization instruction of the user, wherein the access authorization notification comprises an access permission for the personal information of the user;
  receiving an access authorization result returned by the block chain node, wherein the access authorization result comprises an identifier of a token generated by the block chain node based on the access authorization notification; and
  sending the identifier of the token to a second agent node, so that the second agent node obtains to-be-accessed personal information from the block chain system based on the identifier of the token;
  wherein the access authorization notification further comprises a personal information field identifier that is authorized by the user to be accessed; and
  the personal information field identifier that is authorized by the user to be accessed is obtained in the following manner:
    receiving an authorization request sent by the second agent node, and providing, based on the authorization request, second prompt information about whether to allow authorized access; and
    receiving the access authorization instruction of the user, and obtaining, based on the access authorization instruction, the personal information field identifier that is authorized by the user to be accessed.

10. The method according to claim 9, wherein:
  the import request further comprises a to-be-imported personal information field identifier.

11. The method according to claim 9, wherein before the receiving the authorization request sent by the second agent node, the method further comprises:
  receiving a metadata request sent by the second agent node, wherein the metadata request is used to request metadata of the user; and sending the metadata of the user to the second agent node based on the metadata request;

or sending the first identifier of the user to the second agent node based on the metadata request, so that the second agent node obtains the metadata of the user from the block chain system based on the first identifier, wherein the metadata of the user comprises a personal information field identifier of the user, and the metadata of the user is used by the second agent node to select, from the personal information field identifier of the user, a personal information field identifier needing to be accessed.

12. The method according to claim 9, the sending the access authorization notification to the block chain node comprises:

obtaining metadata of the user, wherein the metadata of the user comprises a personal information field identifier of the user and a block chain node corresponding to the personal information field identifier of the user;

obtaining, based on the personal information field identifier that is authorized by the user to be accessed and the metadata of the user, a block chain node corresponding to the personal information field identifier that is authorized by the user to be accessed; and sending the access authorization notification to the block chain node corresponding to the personal information field identifier that is authorized by the user to be accessed.

13. The method according to claim 9, wherein the access permission for the personal information of the user comprises at least one of:

an identifier of an authorized agent node, a quantity of times of authorized access, or an authorized access time.

14. The method according to claim 9, wherein the to-be-imported personal information field identifier is obtained by:

obtaining, based on the identifier corresponding to the PIMS, a personal information field identifier provided by the PIMS, and presenting the personal information field identifier to the user; and obtaining the to-be-imported personal information field identifier based on a personal information field identifier selected by the user from the personal information field identifier provided by the PIMS.

\* \* \* \* \*